United States Patent
Kosseifi et al.

(10) Patent No.: US 11,651,322 B2
(45) Date of Patent: *May 16, 2023

(54) SECURE PACKAGE DELIVERY

(71) Applicant: AT&T Mobility II LLC, Atlanta, GA (US)

(72) Inventors: Mario Kosseifi, Roswell, GA (US); Joseph Thomas, Marietta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 765 days.

This patent is subject to a terminal disclaimer.

(21) Appl. No.: 16/529,849

(22) Filed: Aug. 2, 2019

(65) Prior Publication Data

US 2019/0354930 A1 Nov. 21, 2019

Related U.S. Application Data

(63) Continuation of application No. 15/064,683, filed on Mar. 9, 2016, now Pat. No. 10,417,603.

(51) Int. Cl.
| | |
|---|---|
| *G06Q 10/08* | (2012.01) |
| *G06F 16/955* | (2019.01) |
| *G06F 21/88* | (2013.01) |
| *G08B 13/24* | (2006.01) |
| *H04W 64/00* | (2009.01) |
| *H04W 68/00* | (2009.01) |
| *G06Q 10/0833* | (2023.01) |

(52) U.S. Cl.
CPC ..... *G06Q 10/0833* (2013.01); *G06F 16/9554* (2019.01); *G06F 21/88* (2013.01); *G08B 13/242* (2013.01); *H04W 64/00* (2013.01); *H04W 68/00* (2013.01)

(58) Field of Classification Search
CPC ................................................. G06Q 10/0833
See application file for complete search history.

(56) References Cited

U.S. PATENT DOCUMENTS

| | | | |
|---|---|---|---|
| 7,096,151 B2 | 8/2006 | Klein | |
| 7,284,699 B2 | 10/2007 | Hamilton | |
| 7,920,063 B2 | 4/2011 | Ulrich | |
| 8,579,186 B2 | 11/2013 | McDonald | |
| 8,797,162 B2 | 8/2014 | Chang et al. | |

(Continued)

OTHER PUBLICATIONS

R. Ramani, Bank Locker Security System based on RFID and GSM Technology, Nov. 18, 2012, International Journal of Computer Applications (Year: 2012).*

(Continued)

*Primary Examiner* — Resha Desai
*Assistant Examiner* — Ismail A Manejwala
(74) *Attorney, Agent, or Firm* — Guntin & Gust, PLC; Douglas Robert Schnabel

(57) ABSTRACT

Wireless presence is used as a theft prevention mechanism for packages. When a package is shipped, the package includes a wireless security device. Before the package is delivered to its final destination shipping address, the wireless security device is activated and programmed with a security credential. The security credential, though, is based on information obtained during an initial purchase. The wireless security device may thus only be deactivated by a recipient participating in the initial purchase.

20 Claims, 25 Drawing Sheets

(56) References Cited

U.S. PATENT DOCUMENTS

| | | |
|---|---|---|
| 8,860,576 B2 | 10/2014 | Weller et al. |
| 2006/0125642 A1 | 6/2006 | Chandaria |
| 2014/0279596 A1* | 9/2014 | Waris ............... G06Q 10/08355 |
| | | 705/317 |
| 2015/0066797 A1* | 3/2015 | Outwater ............. G06Q 10/083 |
| | | 705/333 |
| 2015/0235175 A1* | 8/2015 | Hall ................... G06Q 10/0833 |
| | | 705/333 |
| 2016/0048796 A1* | 2/2016 | Todasco ................ H04W 12/06 |
| | | 705/330 |
| 2017/0091708 A1 | 3/2017 | Rao |
| 2017/0193442 A1* | 7/2017 | Ekkel .................... G01S 5/0236 |

OTHER PUBLICATIONS

InOutParcel, FAQ What if I didn't include the customer ID No. in my package?, Dec. 18, 2015.

* cited by examiner

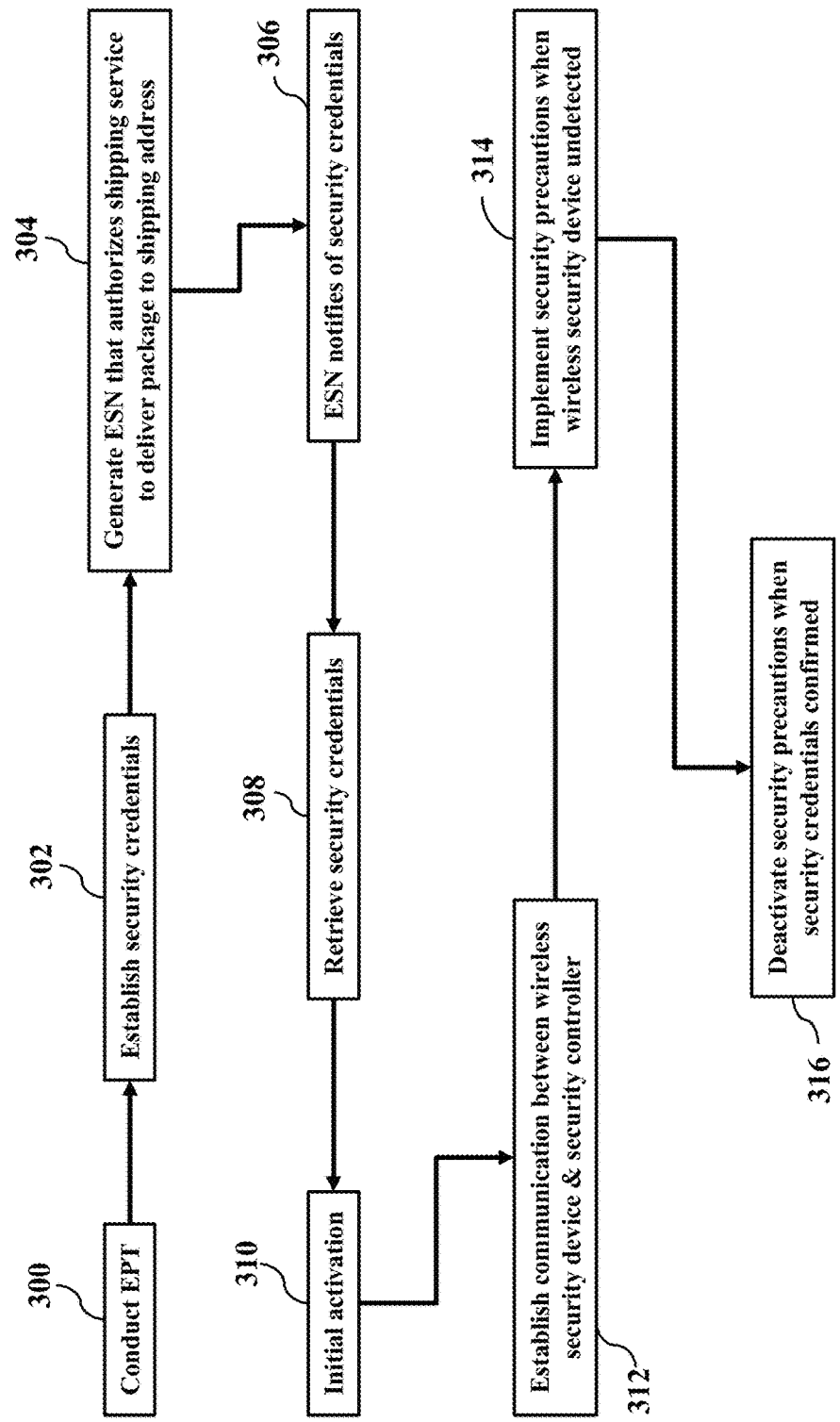

SECURE PACKAGE DELIVERY

CROSS-REFERENCE TO RELATED APPLICATION

This application is a continuation of U.S. application Ser. No. 15/064,683 filed Mar. 9, 2016 and since issued as U.S. Pat. No. 10,417,603, which is incorporated herein by reference in its entirety.

BACKGROUND

Package theft is a problem. As online retail sales increase, more packages are being stolen from homes and businesses. These thefts increase costs for us all.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIG. 25 is a flowchart illustrating an algorithm for secure package delivery, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
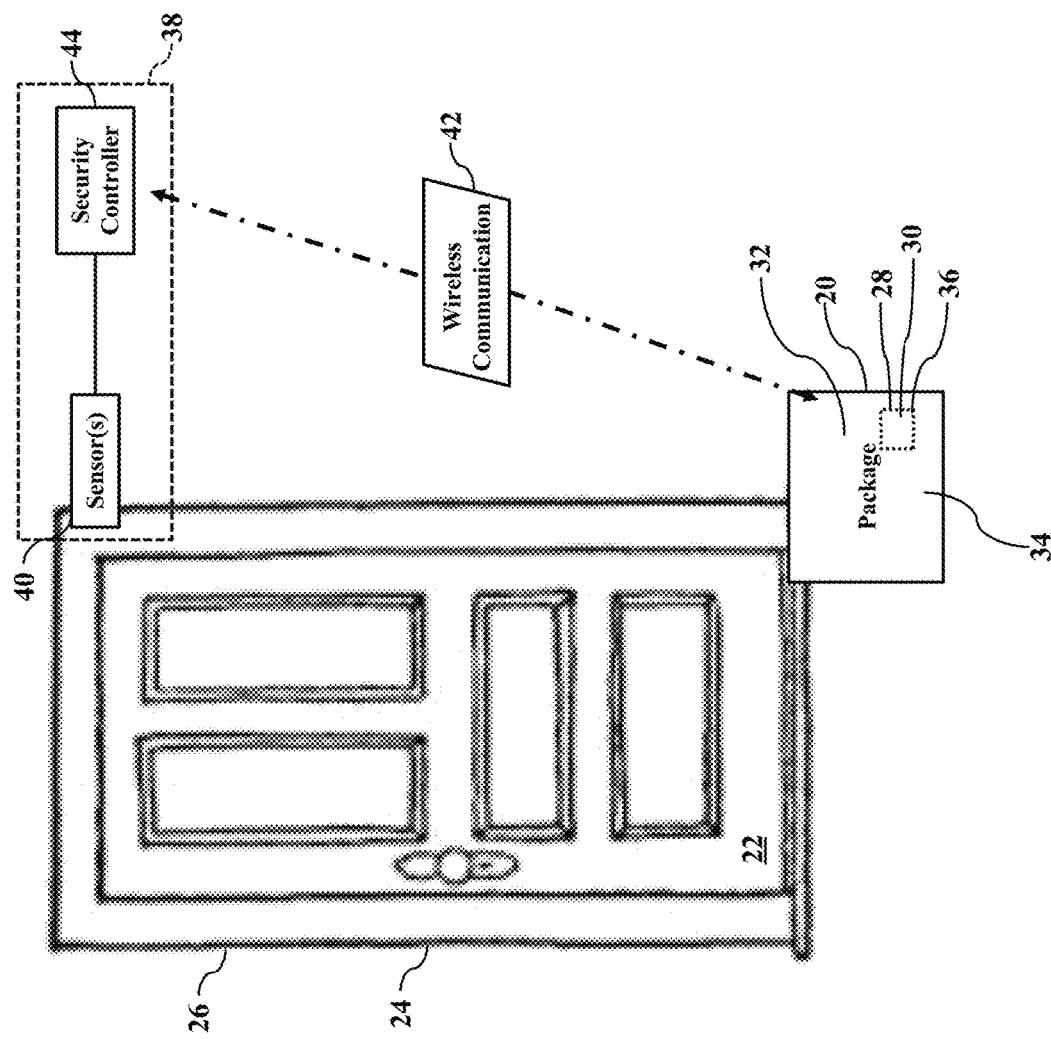
FIGS. 1-3 are simplified schematics illustrating an environment in which exemplary embodiments may be implemented.
Figure 2:
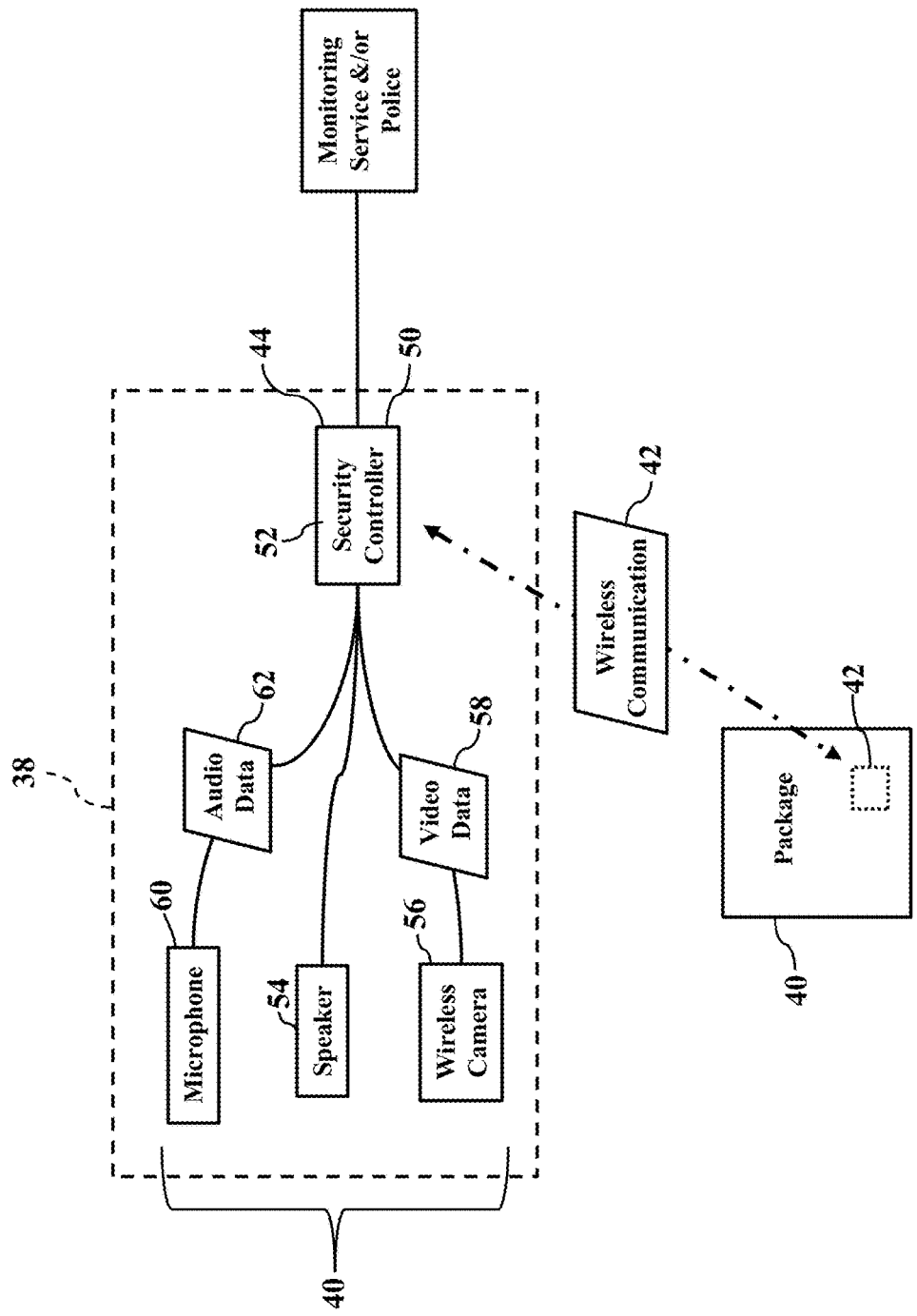
Figure 3:
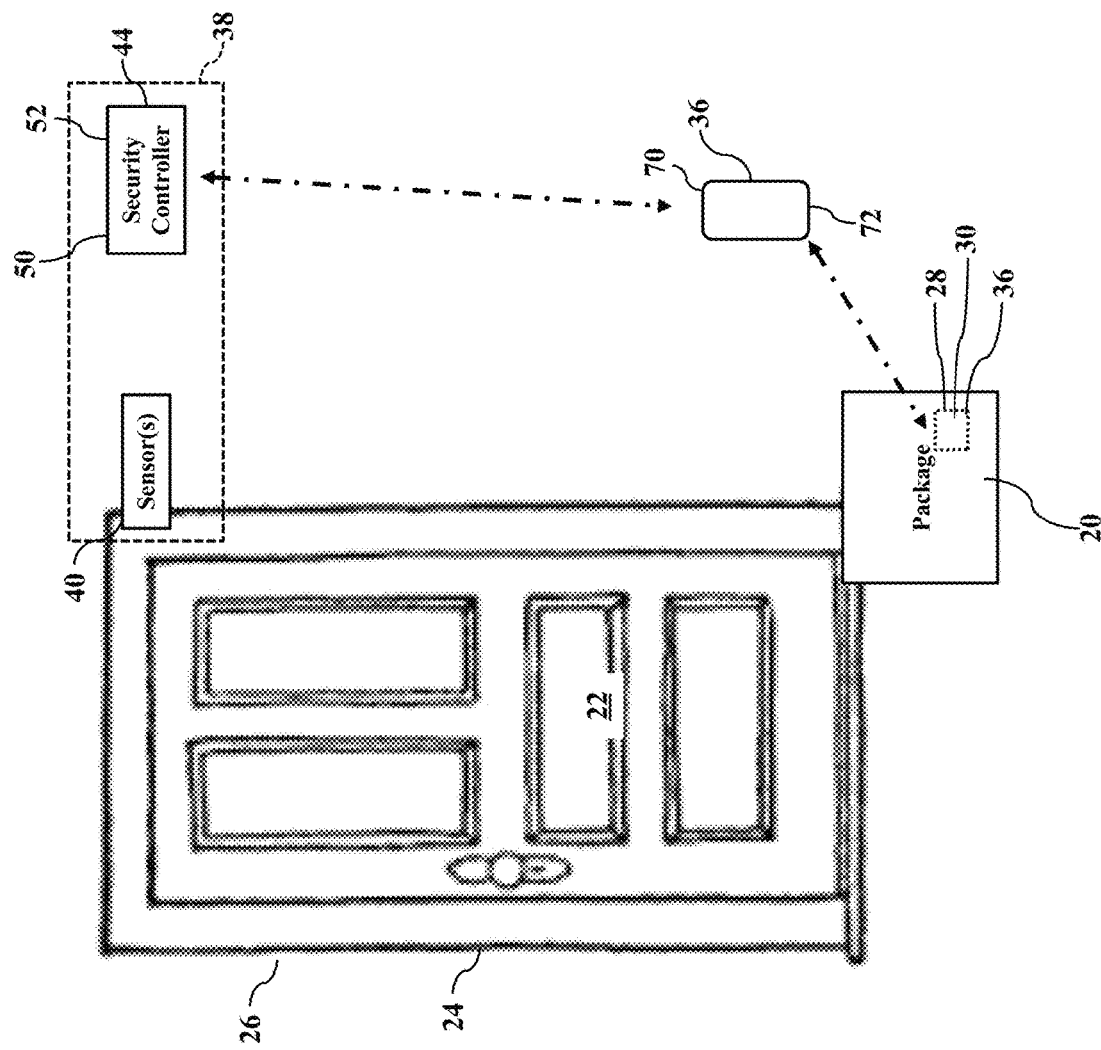

FIGS. 1-3 are simplified schematics illustrating an environment in which exemplary embodiments may be implemented. FIG. 1 illustrates packages 20 delivered to a destination. While exemplary embodiments may be applied to any business or residential location, FIG. 1 illustrates the packages 20 placed near a front door 22 of a porch 24 of a home 26. The packages 20, in other words, are delivered to a street address associated with the home 26. As the reader likely understands, the packages 20 are susceptible to theft, especially when no occupant accepts delivery.

Here, though, exemplary embodiments help prevent theft. When the package 20 is delivered (perhaps by a UPS® or FEDEX® delivery service), a wireless security device 28 undergoes an initial activation 30. FIG. 1 illustrates the wireless security device 28 integrated within, or attached to, the package 20. As a simple example, the wireless security device 28 may be integrated with internal packing materials that protect or wrap a product 32 packaged inside a container 34 (such as a cardboard shipping box). Regardless, the wireless security device 28 may be initially activated using security credentials 36 associated with the rightful recipient. That is, the UPS® or FEDEX® delivery driver activates the wireless security device 28 using information known to, or obtained from, the rightful addressee.

A security system 38 then monitors the package 20. As the reader likely understands, many homes and businesses have the security system 38 that protects the occupants. The security system 38 has many different sensors 40 that protect the occupants from fire, intrusion, and other security conditions. The security system 38 may thus interface with the wireless security device 28 to protect the package 20 from theft. That is, the wireless security device 28 establishes wireless communication 42 with a security controller 44. The security controller 44 monitors and/or manages the many different sensors 40 of the security system 38. Here, then, the security controller 44 also monitors a wireless presence of the wireless security device 28.

Exemplary embodiments thus protect from theft. As long as the wireless security device 28 remains in the wireless communication 42 with the security controller 44, the security controller 44 may infer that the package 20 remains at the door 22 or on the porch 24 of the home 26. However, if the wireless communication 42 is lost, the security controller 44 may infer that the package 20 is being moved or even stolen. That is, if the security controller 44 can no longer detect the wireless security device 28, exemplary embodiments may assume that an unauthorized person/thief is attempting to steal the package 20.

FIG. 2 illustrates security precautions 50. When the wireless communication 42 is lost, and/or the wireless security device 28 is undetected, the security controller 44 may initiate an alarm 52. For example, the security controller 44 may command or activate an audible siren or speaker 54, thus providing an audible warning to alert occupants and neighbors. The security controller 44 may also command a digital video camera 56 to capture live video data 58, perhaps recording and documenting the theft and identifying the thief. The security controller 44 may also command a microphone 60 to capture live audio data 62, perhaps further documenting the theft. The security controller 44 may even send and route the live video data 58 and/or the live audio data 62 to a remote network destination, such as a third party monitoring service and/or local police. Exemplary embodiments, in plain words, may generate the alarm 52 when theft is inferred.

FIG. 3 illustrates deactivation. Once the package 20 is delivered, at some time the rightful recipient will want to retrieve the package 20 without activating the security system 38. The addressee, in other words, will want to claim or accept the package 20 without setting off the alarm 52. Here, then, the recipient may use a mobile device 70 to deactivate the security precautions 50. While the mobile device 70 may be any processor-controlled device, most readers are thought familiar with a mobile smartphone 72. As the recipient approaches or inspects the package 20, her smartphone 72 may establish wireless communication with the wireless security device 28 and/or with the security system 38. For example, the smartphone 72 may establish wireless communication with the wireless security device 28. When the smartphone 72 and the wireless security device 28 communicate, the smartphone 72 may send or confirm the same security credentials 36 that are associated with the rightful recipient. The wireless security device 28 may thus confirm that the security credentials 36 match the initial activation 30. If a match is determined, exemplary embodiments may infer that the smartphone 72 is associated with the rightful addressee. The smartphone 72 may alternatively or additionally establish wireless communication with the security controller 44 to also deactivate the security precautions 50. Regardless, once the security precautions 50 are disabled, the addressee may claim or accept and move the package 20 without generating the alarm 52. However, if the smartphone 72 cannot satisfy the security credentials 36 established during the initial activation 30, theft may be inferred.

Figure 4:
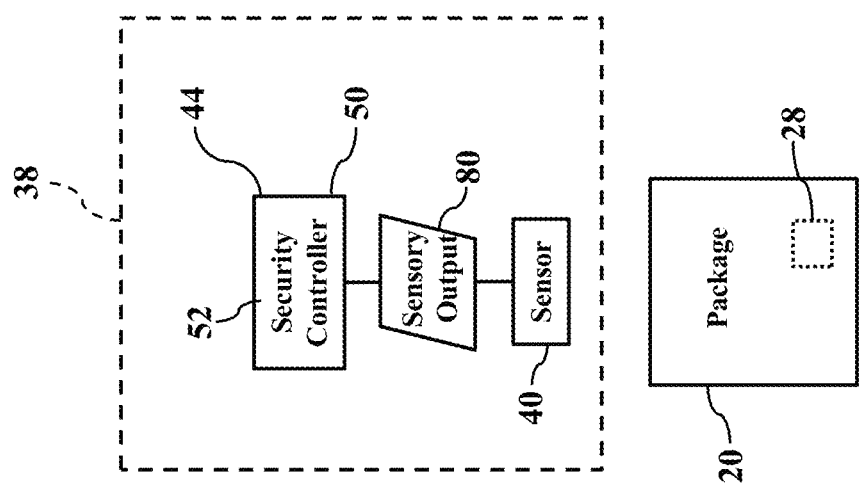
FIGS. 4-5 illustrate sensory detection, according to exemplary embodiments.
Figure 5:
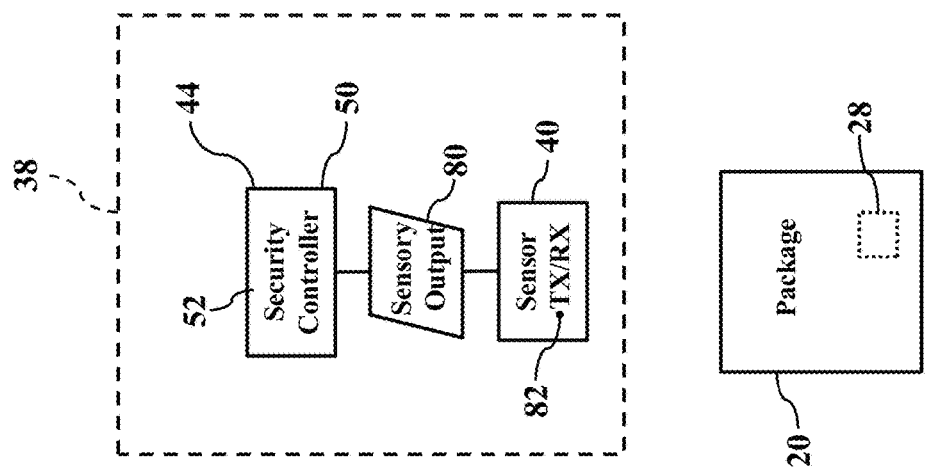

FIGS. 4-5 illustrate sensory detection. When the package 20 is delivered, here the security system 38 may detect the physical placement of the package 20. FIG. 4, for example, illustrates the sensor 40 that detects placement and/or removal of the package 20. The sensor 40 interfaces with the wireless security device 28 and/or with the security controller 44. The sensor 40 generates a sensory output 80 that is indicative of the presence, or absence, of the package 20. The security controller 44 receives the sensory output 80 via a wireless interface (such as a WI-FI® network) or via a wired connection. Regardless, the security controller 44 may use the sensory output 80 to confirm delivery, movement, or removal of the package 20. The sensor 40, for example, may be an optical sensor that uses photoelectrics or a laser to detect placement and/or removal of the package 20. The sensor 40 may sense motion of the package 20 using optical, microwave, and/or acoustical technology to detect placement and/or removal of the package 20. The sensor 40 may even be a weight scale that monitors a weight of the package 20 to detect placement and removal. FIG. 5 illustrates the sensor 40 as a package transceiver ("TX/RX") 82 that communicates with the wireless security device 28. The package transceiver 82 may be installed at a location at which the package 20 is typically delivered or placed (such as near the front door 22 or porch 24 illustrated in FIGS. 1 and 3). The package transceiver 82 and the wireless security device 28 may communicate using any frequency or standard (such as short-range or near-field technologies), thus allowing exemplary embodiments to determine when the wireless security device 28 leaves the vicinity of the package transceiver 82. Regardless, exemplary embodiments may use any sensory and wireless technology to infer movement or removal of the package 20 and to activate the alarm 52.

Figure 6:
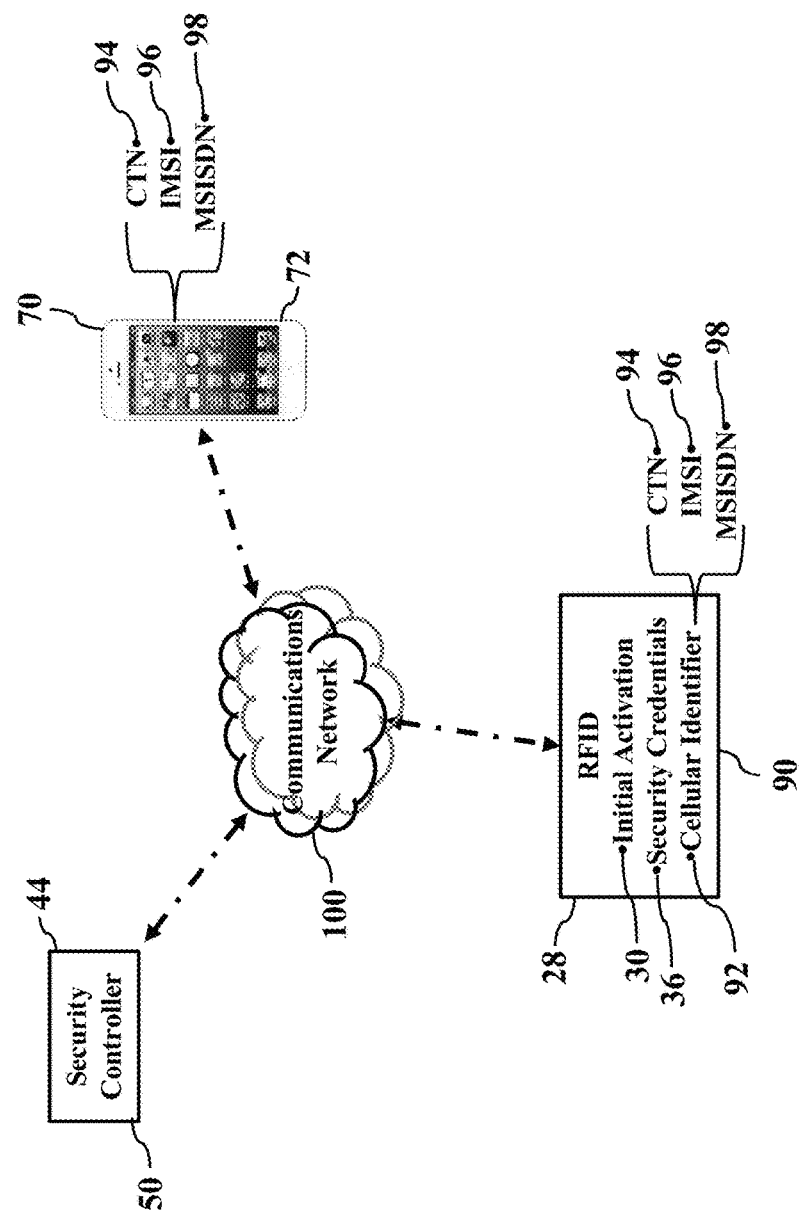
FIG. 6 illustrates a wireless security device, according to exemplary embodiments.

FIG. 6 further illustrates the wireless security device 28. Here the wireless security device 28 is illustrated as a radio-frequency identification (or "RFID") device 90 (or "tag"). When the UPS® or FEDEX® delivery driver performs the initial activation 30, the RFID device 90 may be commanded to store the security credentials 36 associated with the rightful recipient. The security credentials 36, for example, may include a cellular identifier 92 associated with the addressee's smartphone 72. The cellular identifier 92 may be any alphanumeric combination that uniquely identifies the smartphone 72. The cellular identifier 92, for example, may be the smartphone's cellular telephone number (or "CTN") 94, International Mobile Subscriber Identity (or "IMSI") 96, or Mobile Station International Subscriber Directory Number ("MSISDN") 98. The wireless security device 28 (such as the RFID device 90) may thus be programmed with the cellular identifier 92 of the rightful recipient's cellular device (such as her smartphone 72). When the RFID device 90 establishes wireless communication with the security controller 44, the RFID device 90 may respond broadcast or send the cellular identifier 92 as the security credentials 36. As the cellular identifier 92 is likely recognized by the security controller 44 (from prior recognition, use, or registration of the recipient's smartphone 72), the RFID device 90 may be authenticated with the security controller 44 and/or with the smartphone 72. The RFID device 90 may even be permitted access to a communications network 100 serving the wireless security device 28, the security controller 44, and/or the smartphone 72, based on the cellular identifier 92.

Figure 7:
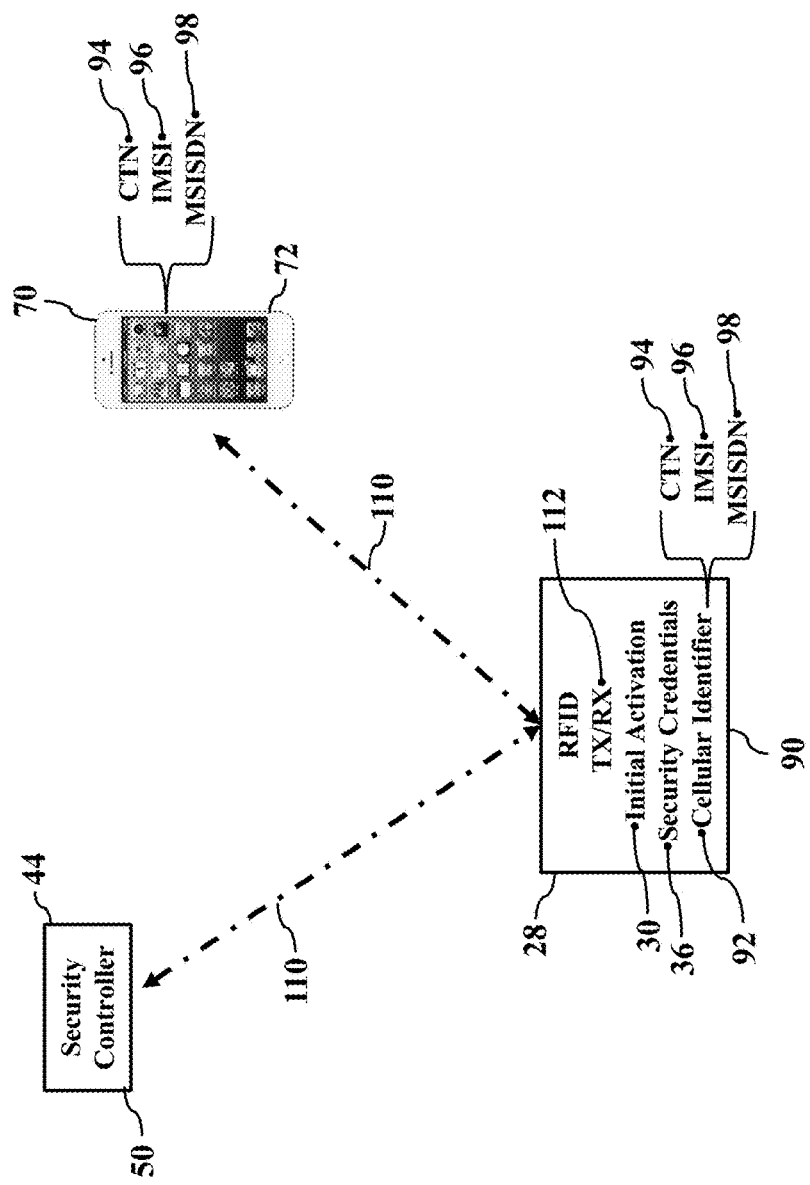
FIGS. 7-8 illustrate wireless technologies, according to exemplary embodiments.

FIG. 7 illustrates broadcast technology. Here the wireless security device 28 may function as an RFID transponder. That is, the wireless security device 28 may transmit an interrogation signal 110. That is, once the wireless security device 28 executes or undergoes the initial activation 30, a wireless transceiver ("TX/RX") 112 in the wireless security device 28 may send the security credentials 36 (such as the cellular identifier 92) as data or information in the interrogation signal 110. The interrogation signal 110 may be continuously, periodically, or randomly transmitted for receipt, such as by the security controller 44 and/or by the recipient's smartphone 72. Exemplary embodiments may activate and/or deactivate the security precautions 50, based on recognition or matching of the security credentials 36.

Figure 8:
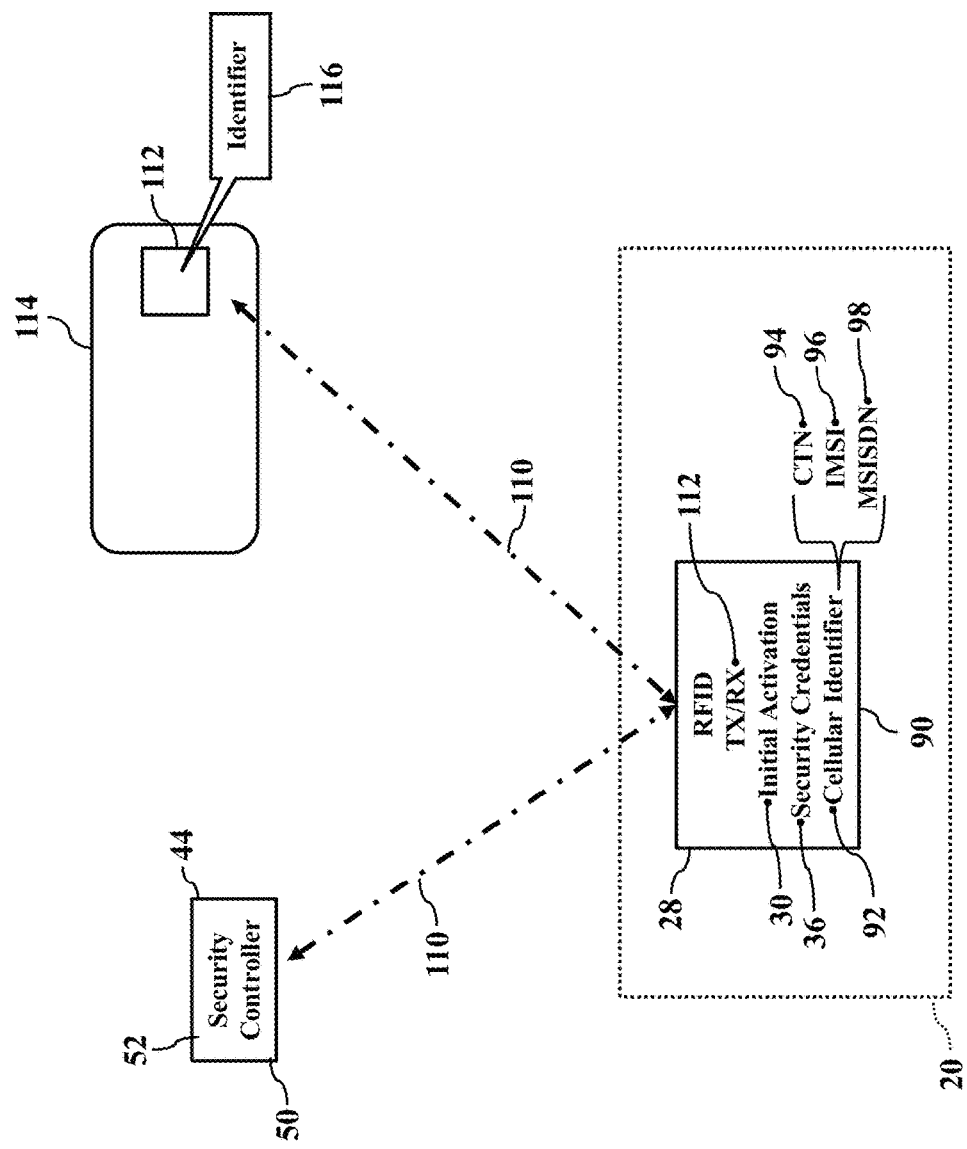

FIG. 8 illustrates reader technology. Here the wireless security device 28 may interface with a smart chip 112 to deactivate the security precautions 50. FIG. 8, for example, illustrates the smart chip 112 embedded in a credit card 114, but the smart chip 112 may be embedded in any article of manufacture (such as passports, clothing, and jewelry). When the rightful recipient wishes to retrieve the package 20, the recipient need only wave or move the credit card 114 into proximity of the wireless security device 28 (e.g., attached to or packaged inside the package 20). The wireless security device 28 broadcasts the interrogation signal 110, and the smart chip 112 responds with its preprogrammed identifier 116. Here, then, the wireless security device 28 may function as an RFID reader or interrogator to illicit a response from the smart chip 112. RFID technology is well understood, so this disclosure need not dwell on the known details. Here, though, the wireless security device 28 may compare the identifier 116 to the security credentials 36 established during the initial activation 30. For example, if the identifier 116 matches or is associated with the cellular identifier 92, then the wireless security device 28 may infer that the smart chip 112 is correctly associated with the legitimate recipient. Exemplary embodiments may deactivate the security precautions 50, thus allowing the recipient to move the package 20 without generating the alarm 52.

Figure 9:
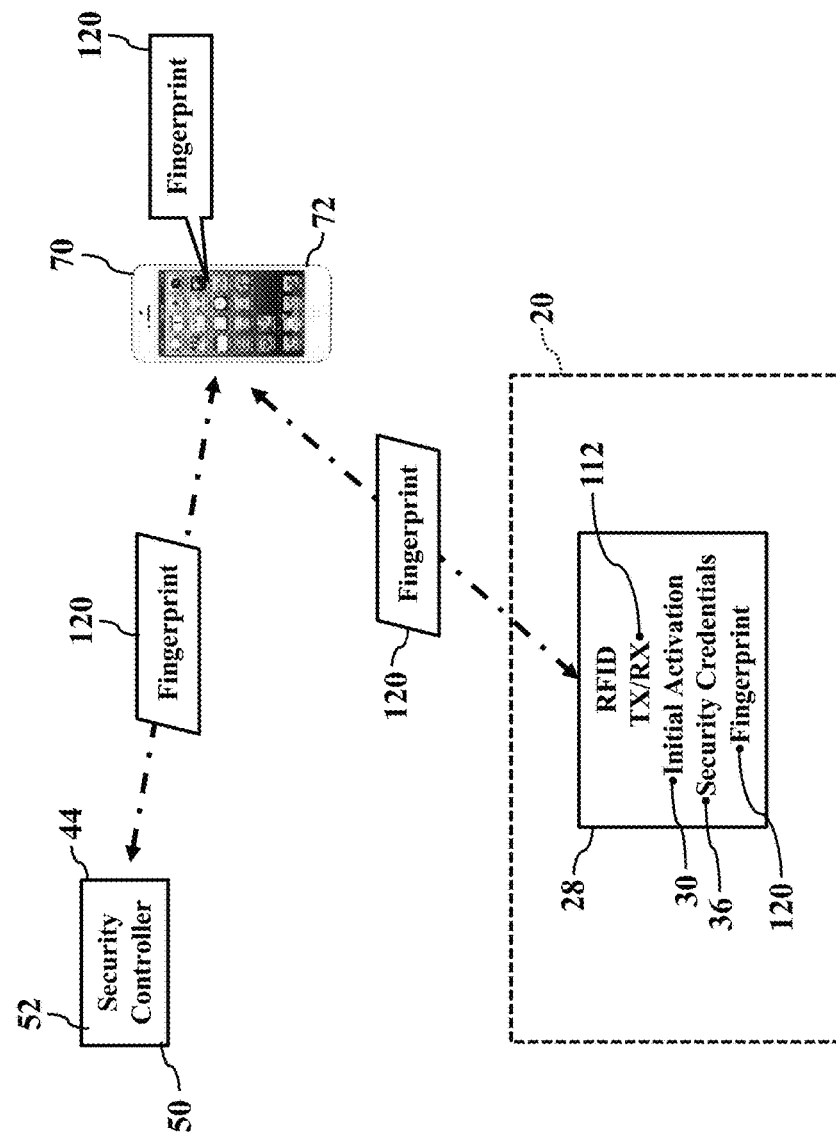
FIG. 9 illustrates biometric confirmation, according to exemplary embodiments.

FIG. 9 illustrates biometric confirmation. Here a biometric trait may be used to augment the security precautions 50. For example, when the UPS® or FEDEX® delivery driver performs the initial activation 30, the wireless security device 28 may be commanded to store the security credentials 36 and/or a fingerprint 120 associated with the rightful recipient. So, when the wireless security device 28 establishes communication with the smartphone 72 and/or with the security controller 44, exemplary embodiments may require that the fingerprint 120 confirm the identity of the rightful addressee. The addressee's fingerprint 120, in other words, may be an additional security benefit that deactivates the security precautions 50, thus allowing the addressee to move the package 20 without generating the alarm 52. The smartphone 72 uses its fingerprint sensor (not shown for simplicity) to capture a scan or image of the fingerprint 120. The smartphone 72 may then send the fingerprint 120 to the wireless security device 28 and/or to the security controller 44. If the fingerprint 120 matches the security credentials 36 established during the initial activation 30, then the wireless security device 28 may confirm the identity of the rightful addressee. Similarly, if the security controller 44 determines that the fingerprint 120 matches what is historically associated with the smartphone 72, the security controller 44 may confirm the identity of the rightful addressee. The addressee's fingerprint 120, in other words, may be an additional security benefit that deactivates the security precautions 50, thus allowing the addressee to move the package 20 without generating the alarm 52. Exemplary embodiments may alternatively use other biometric traits, such as retina scans, audible voice recordings (voiceprints), and facial recognition.

Figure 10:
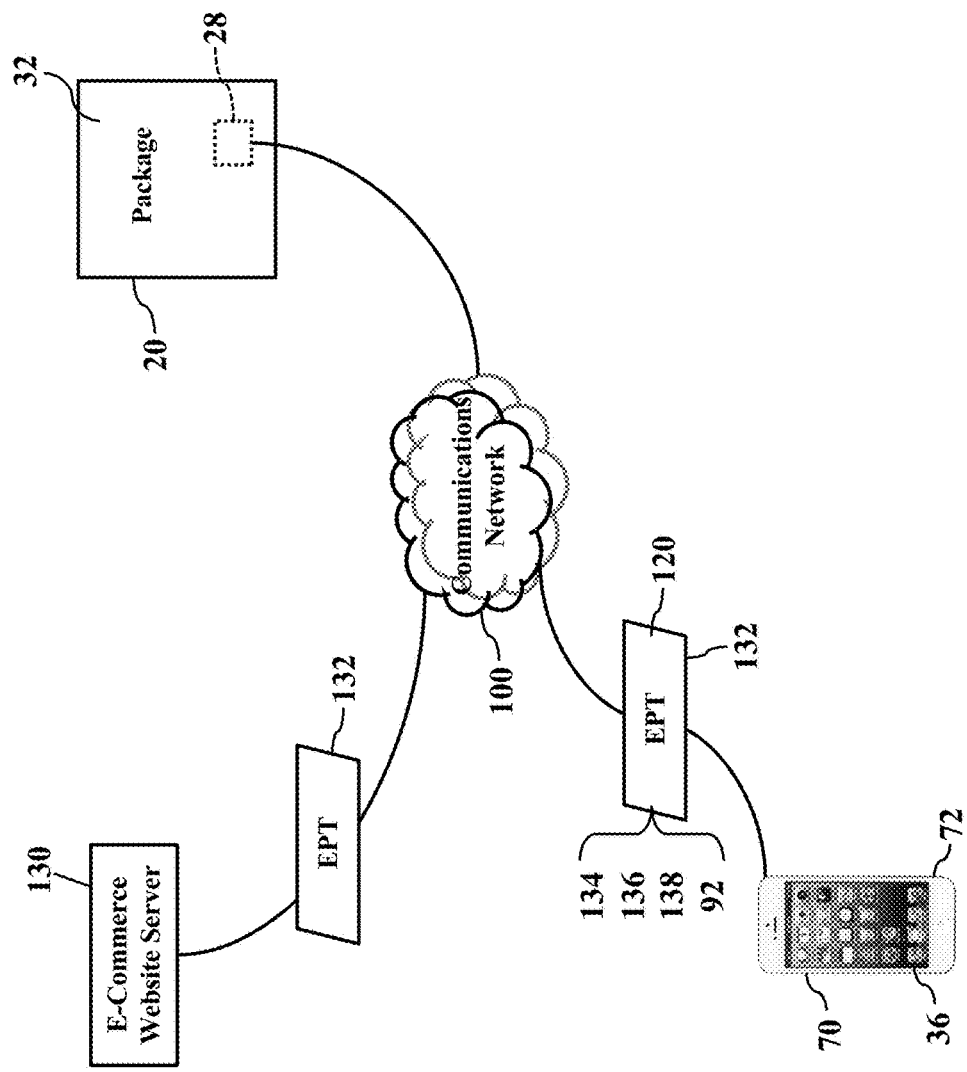
FIGS. 10-12 illustrate security credentials, according to exemplary embodiments.
Figure 11:
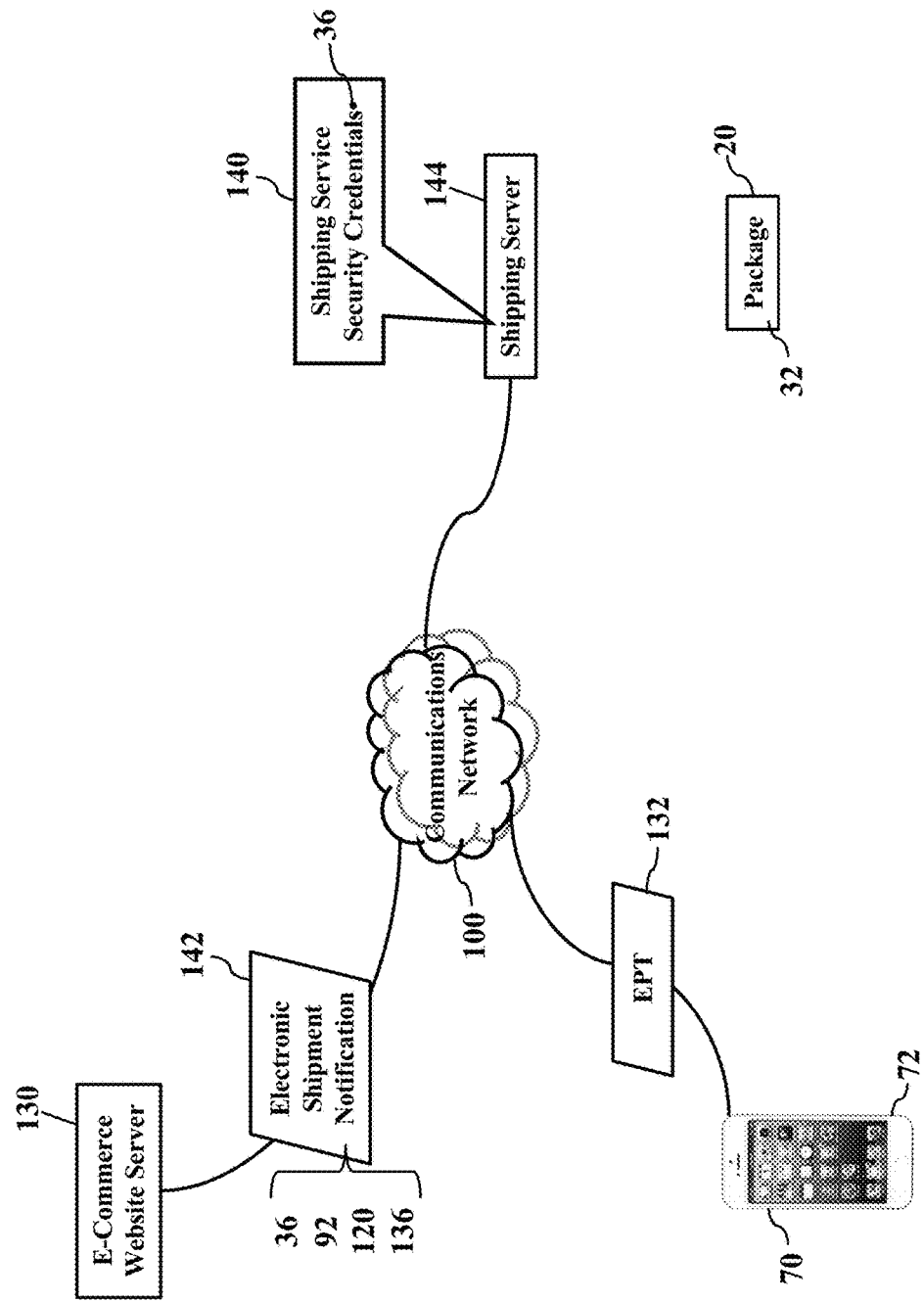
Figure 12:
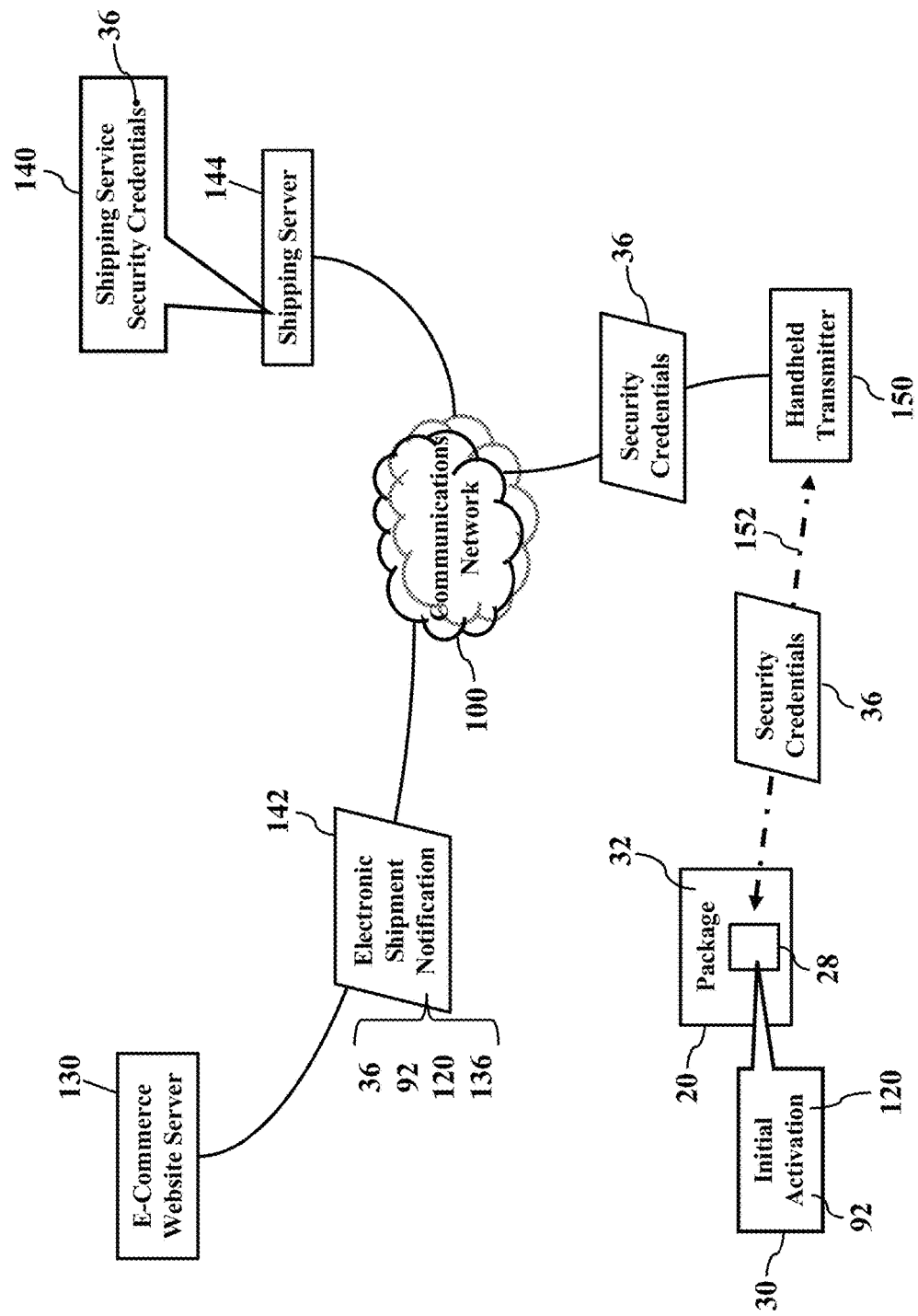

FIGS. 10-12 illustrate the security credentials 36. Here the security credentials 36 may be established during a purchase of the product 32 contained within the package 20. Suppose the product 32 is purchased online using the smartphone 72, thus requiring physical shipment and delivery to the addressee. As the reader likely understands, the smartphone 72 interfaces with a merchant's e-commerce website server 130 via the communications network 100 (such as the Internet) and conducts an electronic purchase transaction (or "EPT") 132. That is, the smartphone 72 downloads a webpage or website via the Internet (e.g., perhaps a uniform resource locator or "URL"), and the user selects an electronic description 134 of her desired product 32. The user inputs her recipient shipping address 136 and enters her payment information 138 (e.g., credit card number). The user may even be required to supply her fingerprint 120 as a security measure. Because the smartphone 72 participated in the purchase, the electronic purchase transaction 132 may uniquely identify the smartphone 72 (such as by the cellular identifier 92). The electronic purchase transaction 132 may also uniquely identify the purchased product 32, perhaps by a stock keeping unit (or "SKU"), model, serial number, or other product identifier. The electronic purchase transaction 132 is addressed to and routes to the Internet Protocol address associated with the merchant's e-commerce website server 130. The e-commerce website server 130 receives and processes the electronic purchase transaction 132 and confirms payment, as is generally known.

FIG. 11 illustrates delivery authorization. Once the product 32 (contained within the package 20) is ready for shipment, the merchant arranges physical delivery using a shipping service 140. While exemplary embodiments are applicable to any delivery or shipping entity, this disclosure will mainly describe UPS® or FEDEX®, as these entities are thought familiar to most readers. Regardless, the merchant notifies the shipping service 140 that the package 20 is ready for shipment to the recipient's shipping address 136. FIG. 11, for example, illustrates an electronic shipment notification 142 that is sent via the communications network 100 (perhaps via the Internet) from the merchant's e-commerce website server 130 to the Internet Protocol address associated with a shipping server 144. The shipping server 144 is associated with the shipping service 140. The electronic shipment notification 142 authorizes the shipping service 140 to deliver the package 20 to the recipient's shipping address 136.

Here, though, the security credentials 36 may also be sent. When the electronic shipment notification 142 is generated, the electronic shipment notification 142 may include data or information representing the identify of the smartphone 72 used to conduct the electronic purchase transaction 132. For example, the electronic shipment notification 142 may specify the addressee's cellular identifier 92 (such as the CTN 94, IMSI 96, or MSISDN 98 illustrated in FIGS. 6-8). However, the electronic shipment notification 142 may additionally or alternatively include the fingerprint 120 as digital data or even an attached image file. When the shipping server 144 receives the electronic shipment notification 142, the electronic shipment notification 142 may include an instruction that causes the shipping server 144 to generate the security credentials 36 (perhaps using or based on the cellular identifier 92 and/or the fingerprint 120.

FIG. 12 illustrates the initial activation 30. As the reader understands, the package 20 is finally delivered to its destination (e.g., the shipping address 136). The package 20 contains the wireless security device 28 (as this disclosure above explained). The UPS® or FEDEX® delivery driver usually scans a barcode that logs the final delivery (not shown for simplicity). Here, though, the delivery driver may also conduct the initial activation 30. The delivery driver, for example, may use a handheld transmitter 150 to log the final delivery. The handheld transmitter 150 may also query the shipping server 144 and retrieve the security credentials 36 specified by the electronic shipment notification 142. The handheld transmitter 150, for example, may retrieve the cellular identifier 92 and/or the fingerprint 120 provided during the initial purchase of the product 32. When the delivery driver logs the final delivery, the handheld transmitter 150 may wirelessly send an activation signal 152 to the wireless security device 28. The activation signal 152 may include the security credentials 36 established during the initial purchase of the product 32. The activation signal 152 may thus command or instruct the wireless security device 28 to begin operation and to store the cellular identifier 92 and/or the fingerprint 120 specified by the electronic shipment notification 142. Exemplary embodiments may thus begin monitoring for unauthorized removal of the package 20, as this disclosure explains.

Figure 13:
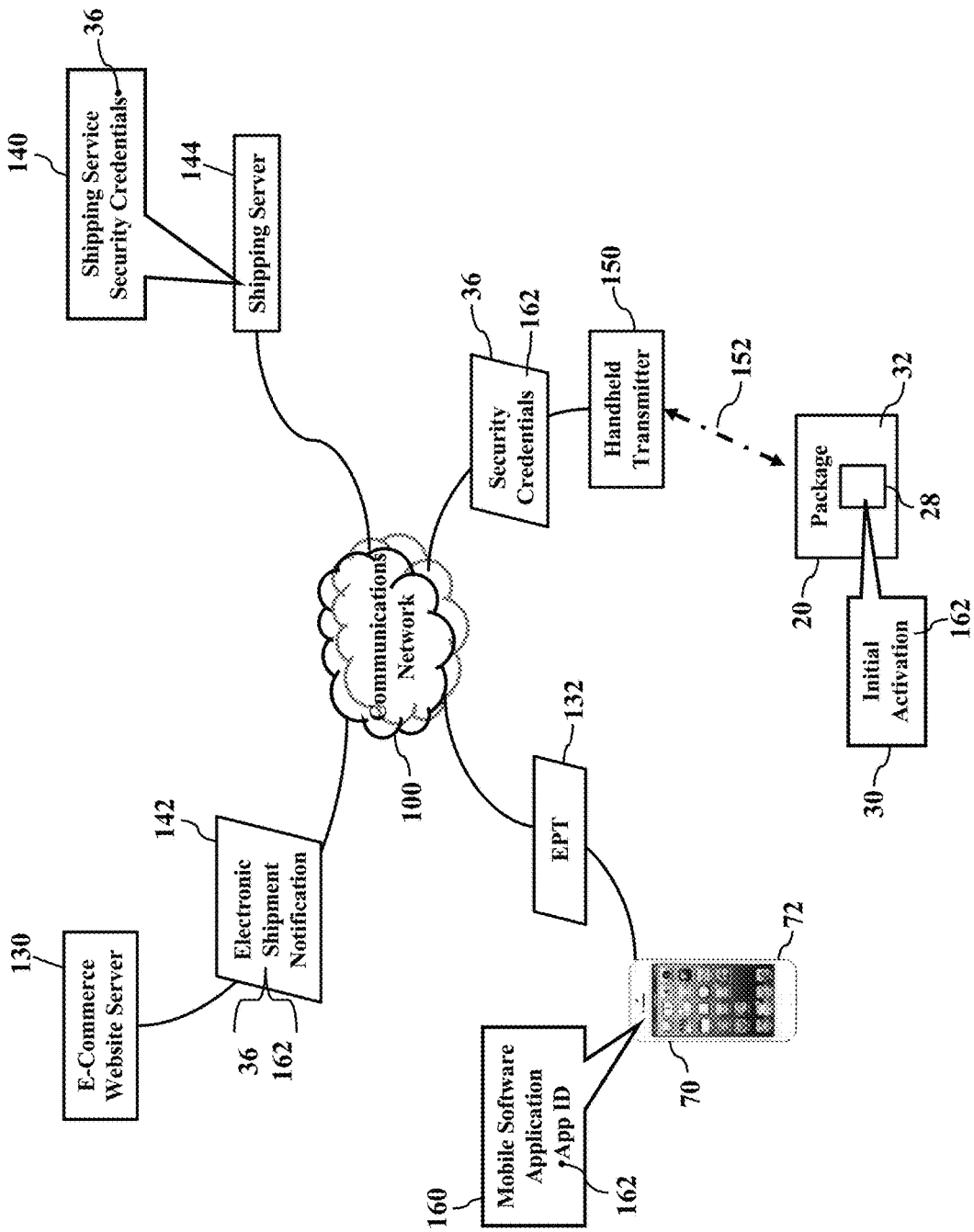
FIG. 13 illustrates mobile confirmation, according to exemplary embodiments.

FIG. 13 illustrates mobile confirmation. Here exemplary embodiments may require verification of a mobile software application 160 to release the package 20 to the rightful addressee. As the reader may understand, many online merchants offer the mobile software application 160 for download (perhaps via the Internet). For example, AMAZON®, KOHL'S®, HOME DEPOT®, and many other retailers provide the mobile software application 160 (or "app") as an interface for their respective goods and services. So, when the product 32 is purchased using the smartphone 72, exemplary embodiments may also record or log the mobile software application 160 conducting the electronic purchase transaction 132. That is, when the merchant authorizes the shipping service 140, the electronic shipment notification 142 may include an application identifier (or "App ID") 162 associated with the mobile software application 160. The application identifier 162 may be any alphanumeric combination that uniquely identifies the mobile software application 160 used to conduct the electronic purchase transaction 132. So, when the delivery driver logs the final delivery, the handheld transmitter 150 may retrieve the application identifier 162 as another one of the security credentials 36. The activation signal 152 may thus command or instruct the wireless security device 28 to store the application identifier 162. Exemplary embodiments may thus require that the smartphone 72 use or report the same application identifier 162 before releasing the package 20, as this disclosure explains.

Figure 14:
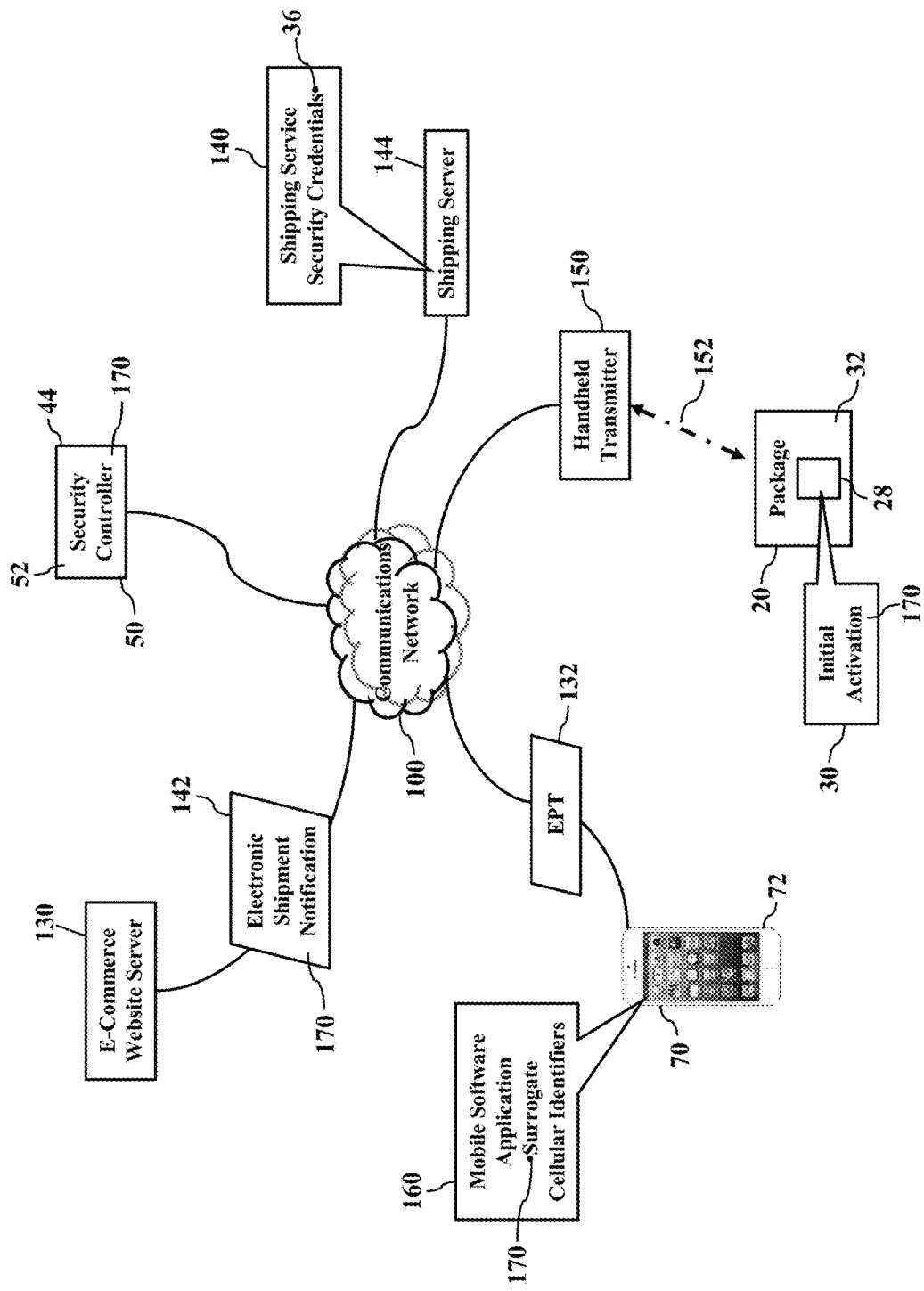
FIG. 14 illustrates a family release, according to exemplary embodiments.

FIG. 14 illustrates a family release. Here exemplary embodiments may permit friends and family members to release the package 20 without activating the alarm 52. As the reader may understand, the addressee may trust family and friends to validly retrieve the package 20. Exemplary embodiments may thus permit the purchasing addressee to specify additional people who can move/accept/retrieve the package 20 without triggering the security precautions 50. For example, the addressee may specify one or more surrogate cellular identifiers 170 that may also deactivate the security precautions 50. Suppose, for example, the mobile software application 160 may allow the purchasing addressee to enter or specify additional cellular telephone numbers that can deactivate the security precautions 50. The mobile software application 160 may simply allow the addressee to select additional contact entries in an address book who are authorized to retrieve the package 20. The surrogate cellular identifiers 170 may even be a profile configuration for any online order conducted by the smartphone 72 or the mobile software application 160. The surrogate cellular identifiers 170 may thus be sent to the shipping service 140 via the electronic shipment notification 142 and retrieved for the initial activation 30 of the wireless security device 28 (as above explained). Any mobile device associated with one of the surrogate cellular identifiers 170 may thus wirelessly communicate with the wireless security device 28 and deactivate the security precautions 30. Moreover, the user or recipient may also configure the security controller 44 to store the surrogate cellular identifiers 170 and also disable the security precautions 30 when communicating with the corresponding mobile device. In plain words, trusted family and friends may retrieve the package 20 without activating the alarm 52.

Figure 15:
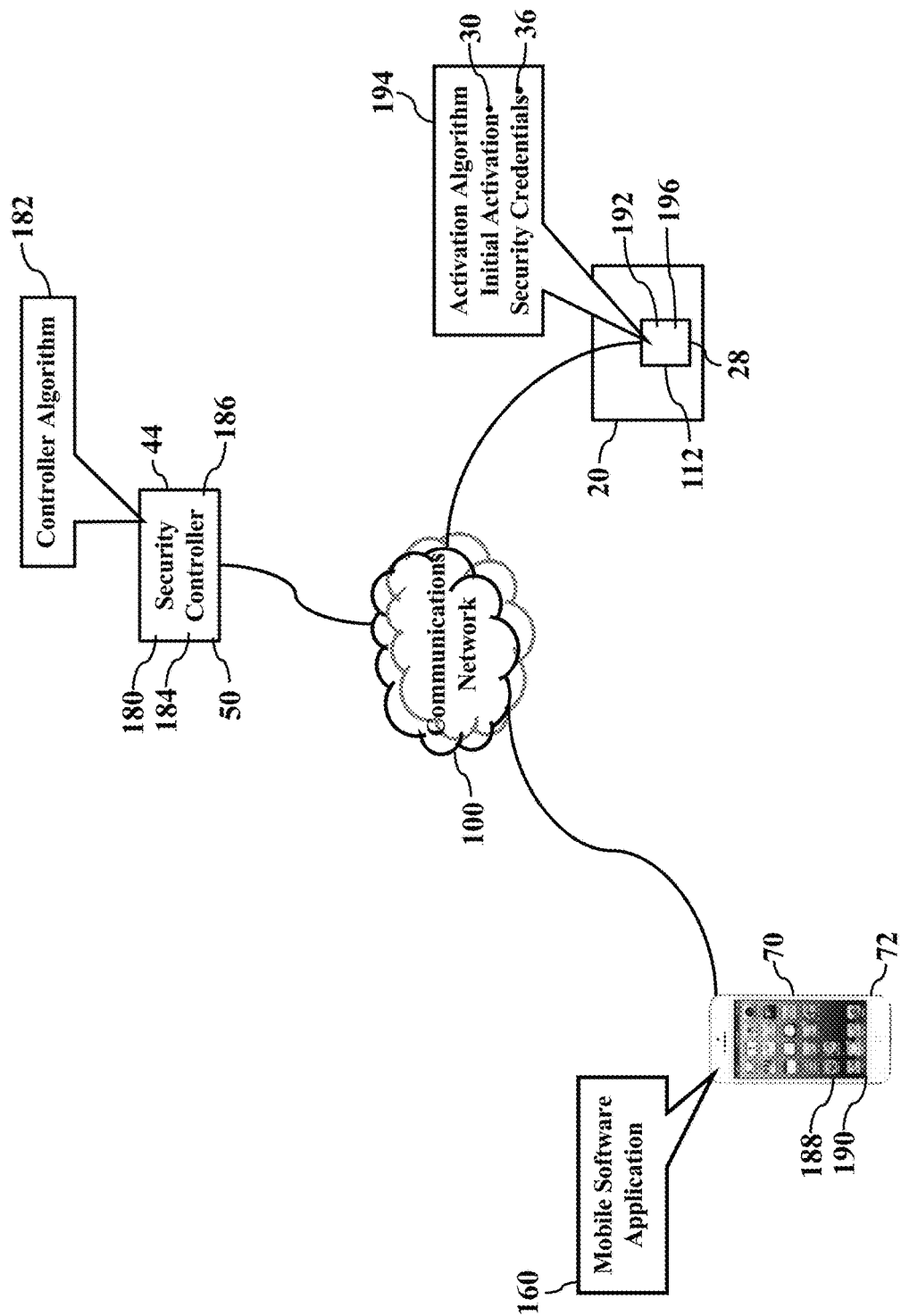
FIGS. 15-17 are more detailed illustrations of the operating environment, according to exemplary embodiments.
Figure 16:
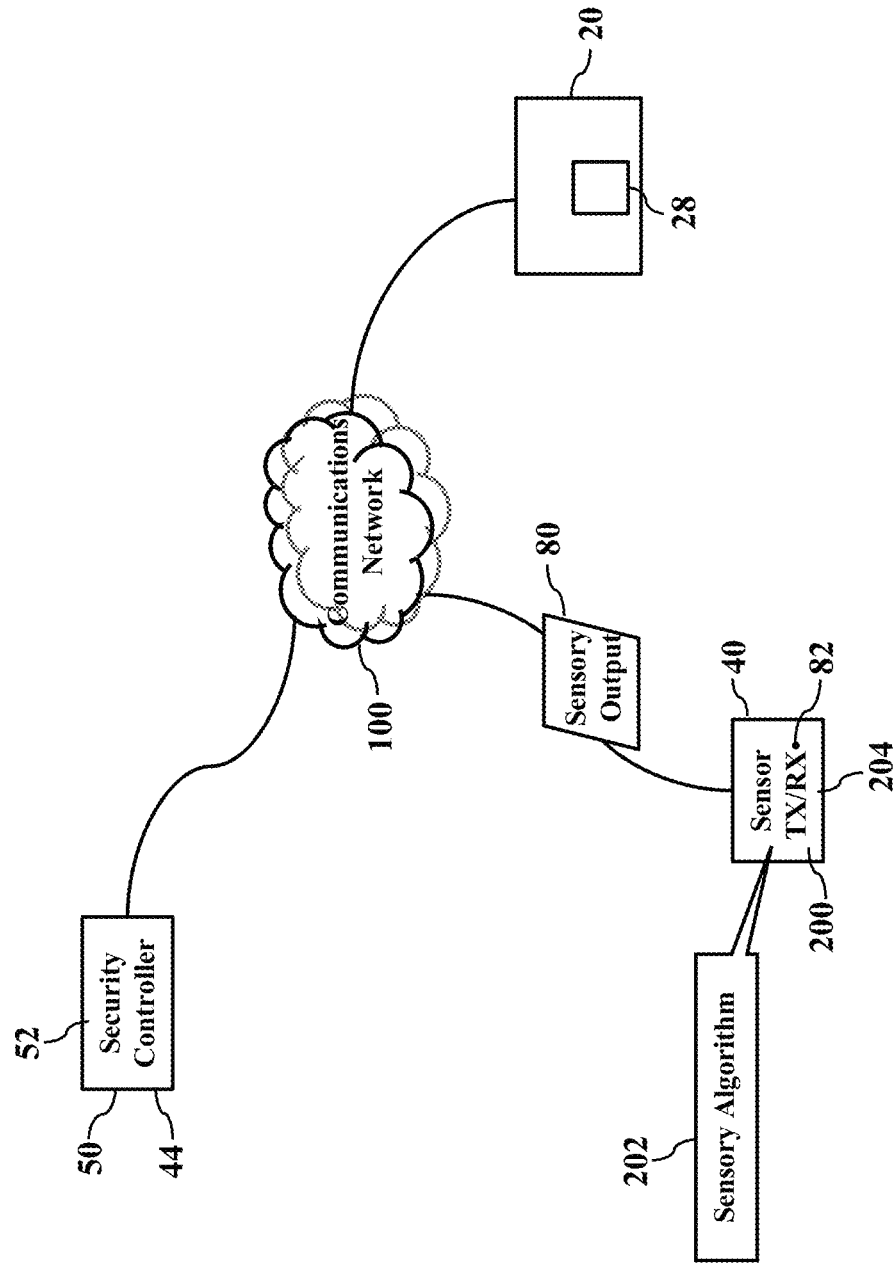
Figure 17:
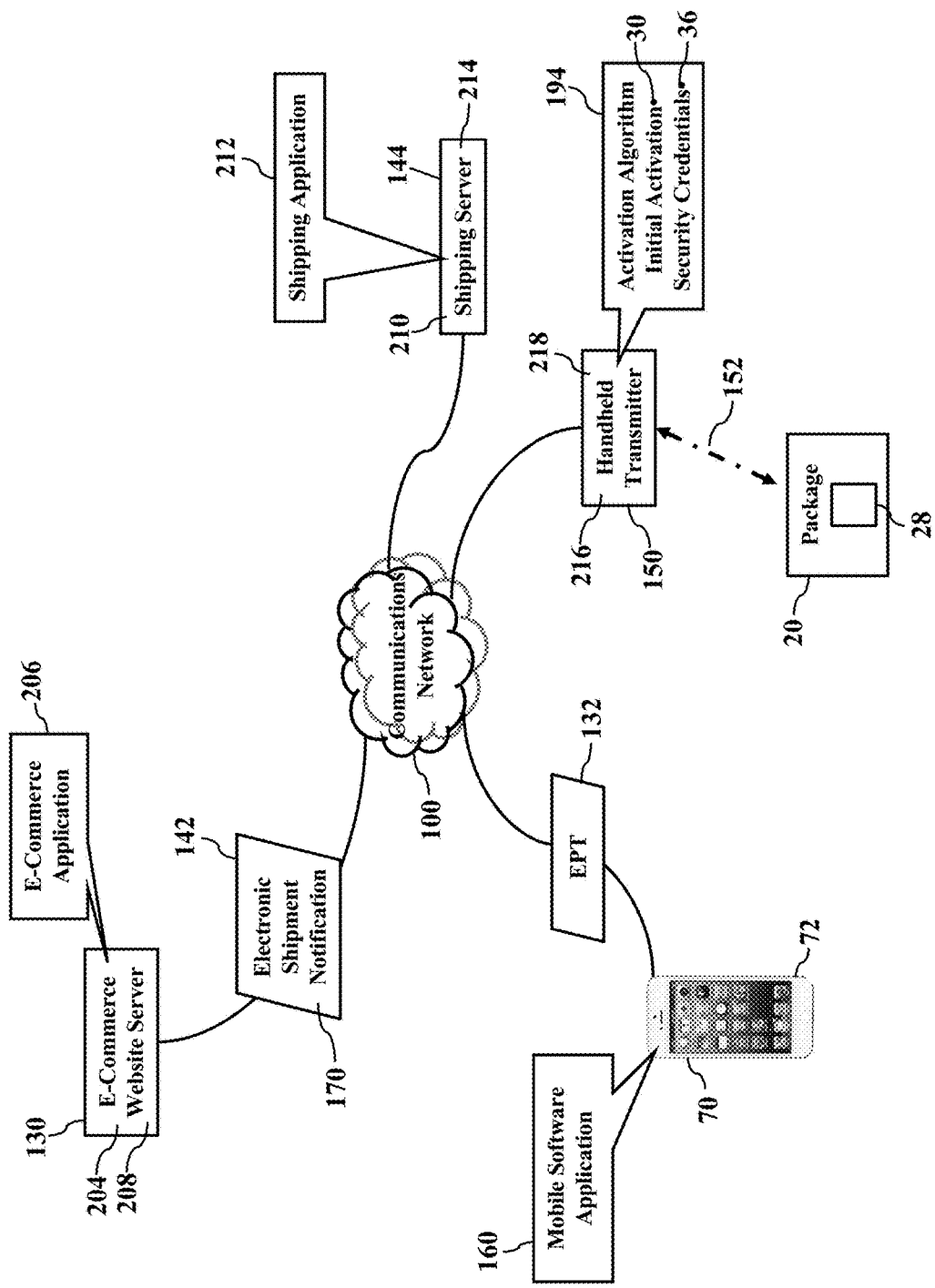

FIGS. 15-17 are more detailed illustrations of the operating environment, according to exemplary embodiments. FIG. 15 illustrates the mobile device 70 (again illustrated as the smartphone 72) communicating via the communications network 100 with the wireless security device 28 and with the security controller 44. The security controller 44 may have a processor 180 (e.g., "µP"), application specific integrated circuit (ASIC), or other component that executes a controller algorithm 182 stored in a memory device 184. The security controller 44 may also have a transceiver 186 for wireless communication with the communications network 100. The smartphone 72 may also have a processor 188 (e.g., "µP"), application specific integrated circuit (ASIC), or other component that executes the mobile software application 160 stored in a memory device 190.

FIG. 15 also illustrates the wireless security device 28. The wireless security device 28 may be a passive or an active element. If the wireless security device 28 is passive, the wireless security device 28 may be an integrated circuit having components that are electrically powered or induced by external signals of a particular frequency and/or electromagnetic energy (such RFID technology that responds to wireless signals sent from the smartphone 72 and/or the security controller 44). If the wireless security device 28 is active, the wireless security device 28 may include a power source (such as a battery) for more functionality, features, and/or wireless range (such as powering the transceiver 112). Regardless, the wireless security device 28 may have a processor 192 (e.g., "µP"), application specific integrated circuit (ASIC), or other component that executes an activation algorithm 194 stored in a memory device 196. Once the initial activation 30 is performed or initialized, the wireless security device 28 may monitor for and recognize the security credentials 36 associated with the addressee and/or the addressee's authorized friends and family members. The security controller 44, for example, may establish wireless communication with the wireless security device 28 and monitor for any indication of unauthorized movement. For example, if the security controller 44 loses communication via a wireless local area network (e.g., WI-FI®), exemplary embodiments may infer that the package 20 is being moved or even stolen. Likewise, if the security controller 44 can no longer detect the wireless security device 28 via a personal area network (e.g., BLUETOOTH®) and/or near field communications, exemplary embodiments may infer that the package 20 is being moved or even stolen.

FIG. 16 illustrates the sensor 40. The sensor 40 interfaces with the wireless security device 28 and/or with the security controller 44. When the package 20 is initially deposited or delivered, the sensor 40 may detect the physical placement of the package 20. If the package 20 is moved or removed, the sensory output 80 indicates the movement or removal.

The security controller 44 may thus use the sensory output 80 to confirm delivery and removal of the package 20. However, if the sensory output 80 indicates removal without deactivation, the security controller 44 may implement the security precautions 50. The sensor 40 may have a processor 200 (e.g., "µP"), application specific integrated circuit (ASIC), or other component that executes a sensory algorithm 202 stored in a memory device 204.

FIG. 17 illustrates still more details. Here the merchant's e-commerce website server 130 may have a processor 204 (e.g., "µP"), application specific integrated circuit (ASIC), or other component that executes an e-commerce application 206 stored in a memory device 208. The shipping server 144 may have a processor 210 (e.g., "µP"), application specific integrated circuit (ASIC), or other component that executes a shipping application 212 stored in a memory device 214. Because the handheld transmitter 150 may participate in the initial activation 30, the handheld transmitter 150 may have a processor 216 (e.g., "µP"), application specific integrated circuit (ASIC), or other component that executes at least a portion of the activation algorithm 194 stored in a memory device 218.

Exemplary embodiments may perform operations. Exemplary embodiments determine a potential unauthorized movement or even theft of the package 20. The smartphone 72, the wireless security device 28, the security controller 44, the sensor 40, the merchant's e-commerce website server 130, the shipping server 144, and the handheld transmitter 150 may thus have network interfaces to the communications network 100, thus allowing collection and retrieval of information. The information may be received as packets of data according to a packet protocol (such as the Internet Protocol). The packets of data contain bits or bytes of data describing the contents, or payload, of a message. A header of each packet of data may contain routing information identifying an origination address and/or a destination address associated with any of the smartphone 72, the wireless security device 28, the security controller 44, the sensor 40, the merchant's e-commerce website server 130, the shipping server 144, and the handheld transmitter 150.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may be applied to other networking environments. The above paragraphs generally refer to a customer's residential communications network 100. Exemplary embodiments, however, may be applied to any wireless network. For example, exemplary embodiments may establish BLUETOOTH® and/or WI-FI® communications links with devices or other networks. The user's smartphone 72, for example, may establish wireless communication with the wireless security device 28 and the security controller 44 using cellular or WI-FI® communication. The user's smartphone 72 may also establish a BLUETOOTH® connection with the wireless security device 28, the security controller 44, or any other nearby, proximate device (such as the sensor 40).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 18:
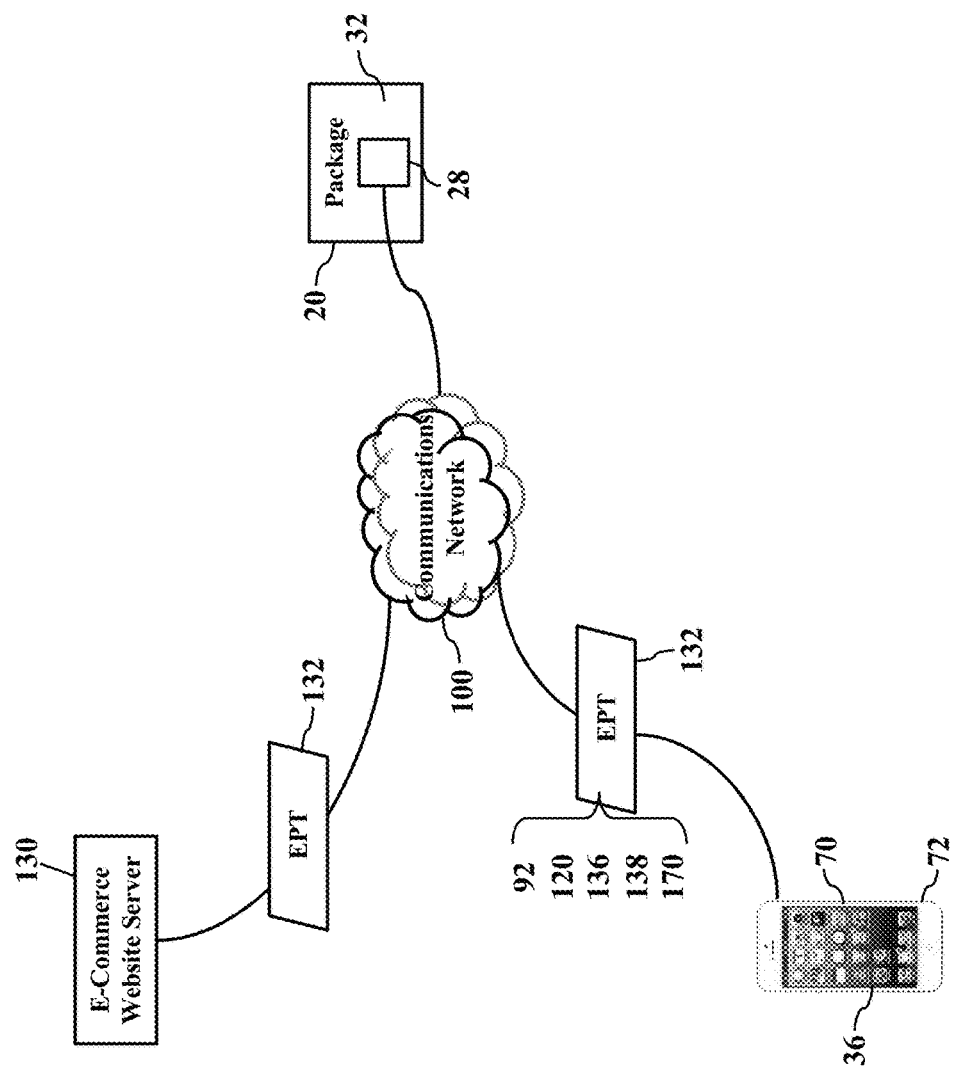
FIGS. 18-19 further illustrate the security credentials, according to exemplary embodiments.
Figure 19:
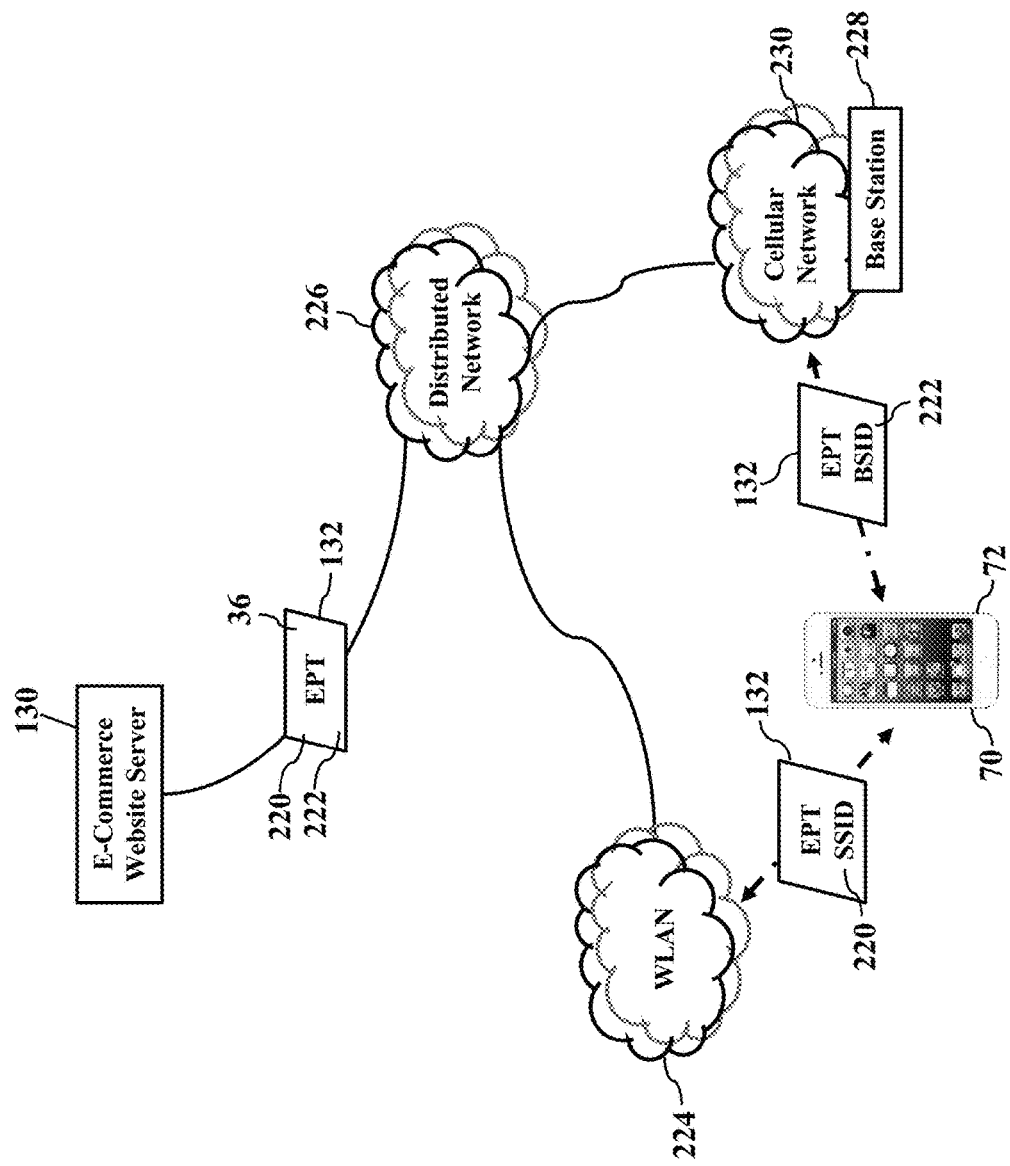
Figure 20:
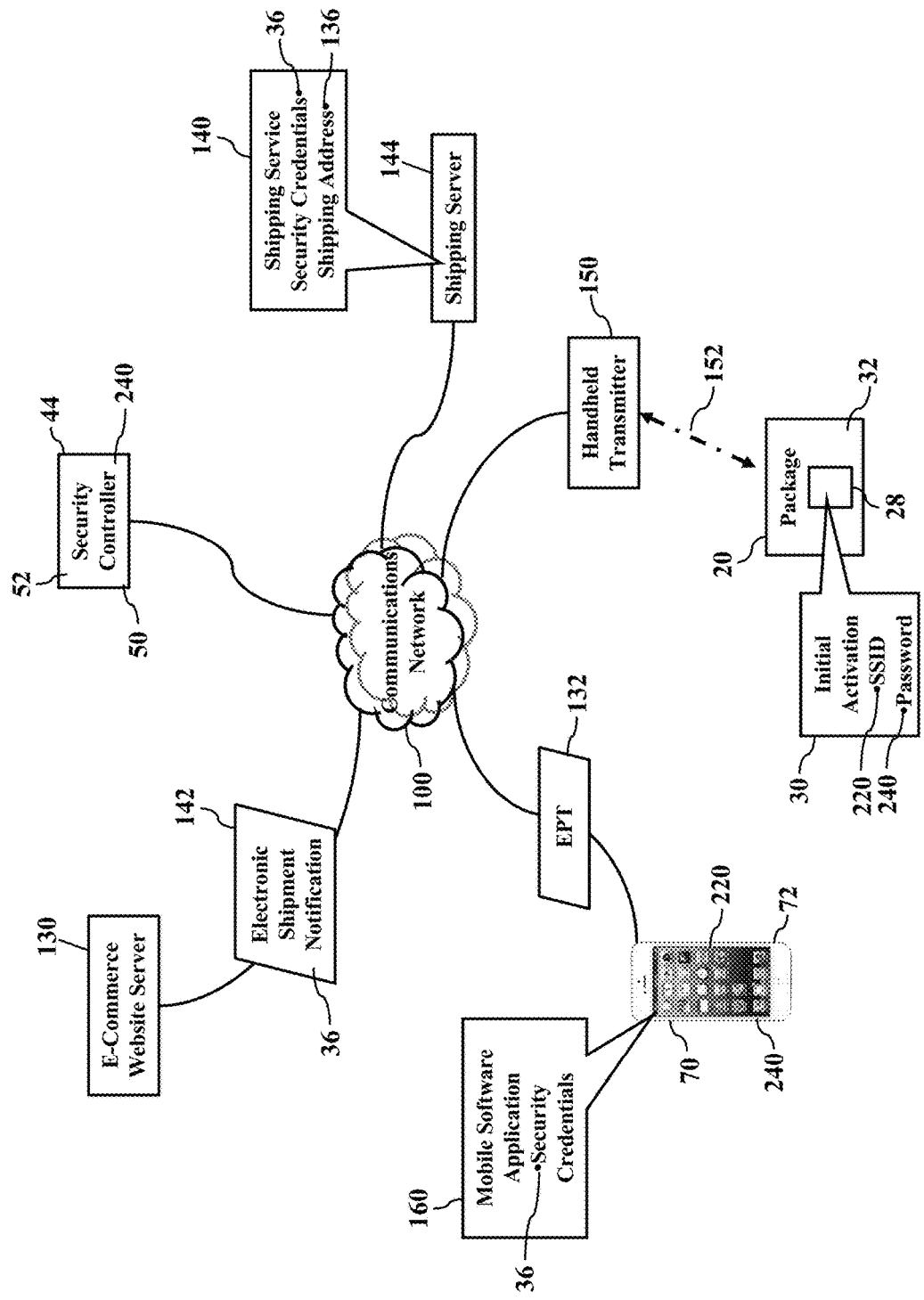
FIGS. 20-23 illustrate wireless theft prevention, according to exemplary embodiments.

FIGS. 18-19 further illustrate the security credentials 36, according to exemplary embodiments. Here the security credentials 36 may be established at purchase and propagated through delivery of the package 20. Again, because online or Internet e-commerce may be generally understood by most readers, FIG. 18 illustrates the smartphone 72 conducting the electronic purchase transaction 132 with the merchant's e-commerce website server 130. The user indicates her product selection, inputs her recipient shipping address 136, and enters her payment information 138. Although not required, the purchasing user may be prompted for the digital scan of her fingerprint 120. If the user wishes to authorize additional family or friends as recipients, the user may input or select additional contact addresses (such as the surrogate cellular identifiers 170). The electronic purchase transaction 132 may thus uniquely identify the purchasing device (e.g., the cellular identifier 92 associated with the smartphone 72), the fingerprint 120, and the additional cellular telephone numbers of the surrogate recipients. The electronic purchase transaction 132 may also uniquely identify the purchased product 32, perhaps by the stock keeping unit (or "SKU") or other product identifier.

FIG. 19 illustrates still more security measures. When the smartphone 72 conducts the electronic purchase transaction 132 with the merchant's e-commerce website server 130, the security credentials 36 may include a service set identifier ("SSID") 220 or a base station identifier ("BSID") 222. For example, if the smartphone 72 conducts the electronic purchase transaction 132 via a wireless local area network ("WLAN") 224 (such as WI-FI®), the electronic purchase transaction 132 may route via an access device to the wireless local area network 224 and into a distributed network 226 (such as a private network or the public Internet). The SSID 220 thus uniquely identifies the wireless local area network 224. However, if the smartphone 72 conducts the electronic purchase transaction 132 via a cellular link, the BSID 222 uniquely identifies a cellular base station 228 in a private cellular network 230 that serves the smartphone 72. The electronic purchase transaction 132 may thus include the SSID 220 and/or the BSID 222 as an additional security credential 36. The electronic purchase transaction 132 may thus include any one or more of the security credentials 36 as loss prevention measures.

FIGS. 20-23 illustrate wireless theft prevention, according to exemplary embodiments. When the package 20 is delivered to its destination (e.g., the shipping address 136), the initial activation 30 is conducted. The handheld transmitter 150 queries the shipping server 144 and retrieves the security credentials 36 specified by the electronic shipment notification 142. The delivery driver thus activates the wireless security device 28 (via the activation signal 152 sent from the handheld transmitter 150). The wireless security device 28 thus stores the security credentials 36 established during the initial purchase of the product 32. For example, the wireless security device 28 may request access to the recipient's residential or business WI-FI® communications network 100 using the service set identifier ("SSID") 220 recognized by the security controller 44. Indeed, if the security credentials 36 also include the corresponding network password 240, the security controller 44 may immediately entrust the wireless security device 28 and begin monitoring its wireless presence. If the package 20 is then moved out of WI-FI® reception or transmission range, the security controller 44 may no longer wirelessly detect the wireless security device 28 and infer the package 20 has been stolen.

Figure 21:
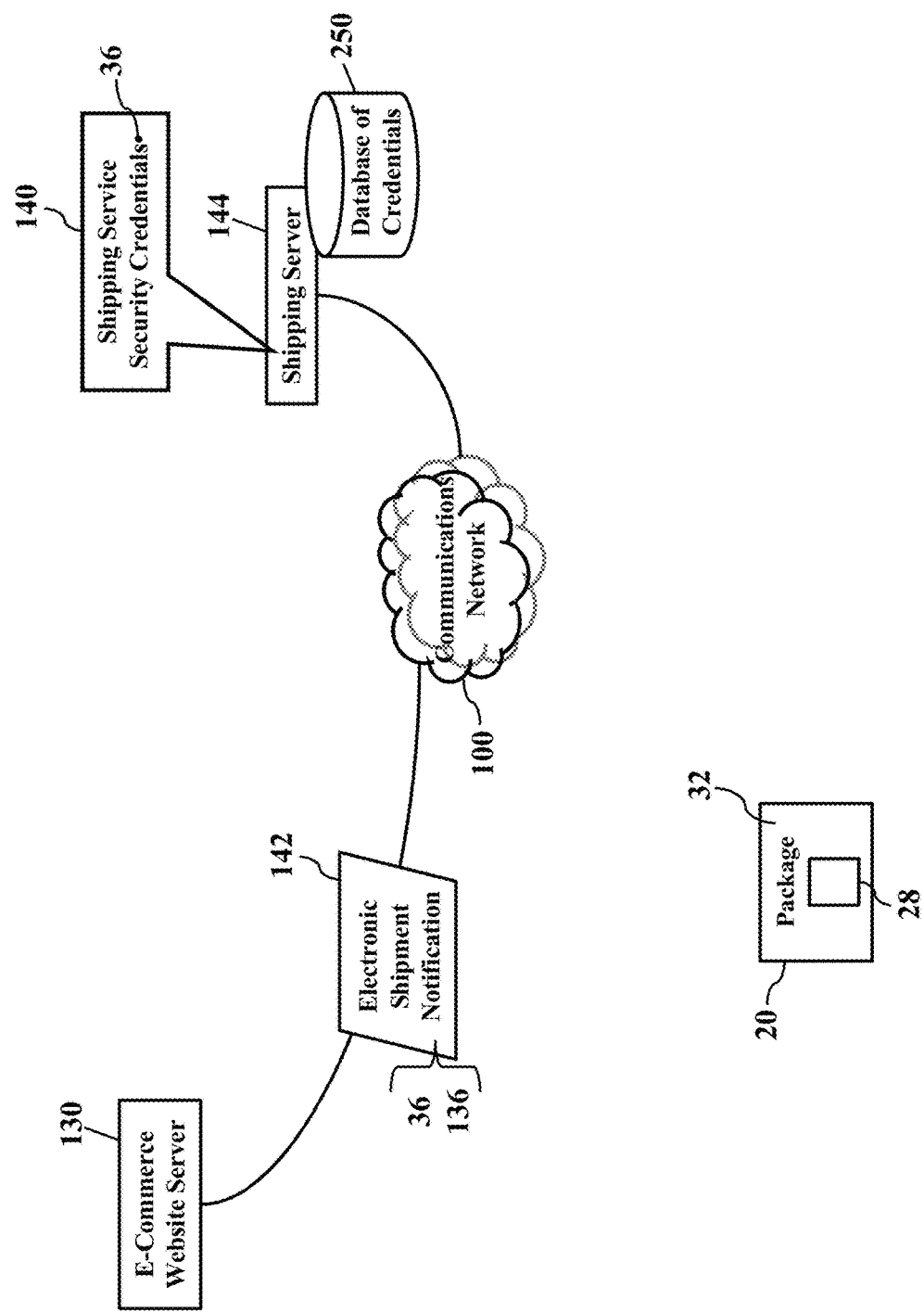

FIG. 21 illustrates a database 250 of credentials. The database 250 of credentials tracks the security credentials 36 associated with the electronic shipment notification 142. That is, when the merchant notifies the shipping service 140 that the package 20 is ready for shipment, the merchant's e-commerce website server 130 sends the electronic shipment notification 142 (via the communications network 100 (perhaps the Internet) to the Internet Protocol address associated with the shipping server 144. The electronic shipment notification 142 authorizes delivery of the package 20 to the recipient's shipping address 136, and the electronic shipment notification 142 includes the security credentials 36. The shipping server 144 may thus instruct the database 250 of credentials to add one or more electronic database entries that electronically associate the security credentials 36 to various information related to the package 20.

Figure 22:
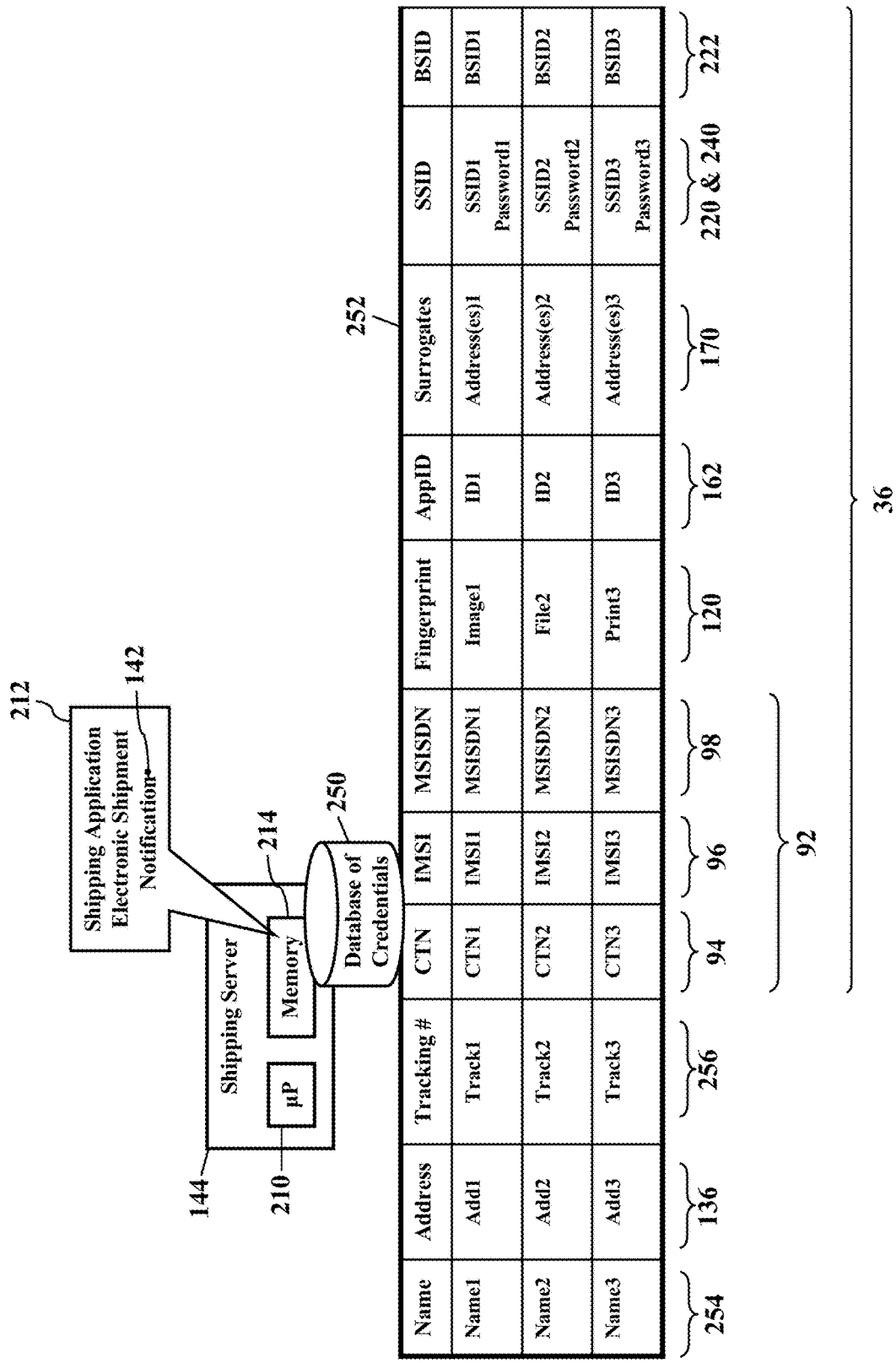

FIG. 22 further illustrates the database 250 of credentials. The database 250 of credentials may log different electronic shipment notifications 142 that are received by the shipping server 144. Each one of the electronic shipment notifications 142 request delivery of a corresponding package to some destination shipping address. FIG. 22 illustrates the database 250 of credentials as being locally stored in the shipping server 144, but some or all of the entries may be remotely stored and accessed via a network (such as the Internet). FIG. 22 also illustrates the database 250 of credentials as a table 252 that electronically maps, relates, or associates different electronic shipment notifications 142 to their corresponding security credentials 36. For example, the database 250 of credentials may have entries that electronically associate the recipient's name 254, the shipping address 136, and/or a tracking number 256 to any of the security credentials 36 (such as the cellular identifier 92, the fingerprint 120, the application identifier 162, the surrogate cellular identifiers 170, the SSID 220 and network password 240, and/or the BSID 222). The shipping application 212 may thus cause the processor 210 to query the database 250 of credentials for any information in the electronic shipment notification 142 and retrieve the corresponding security credentials 36. Although FIG. 22 only illustrates several entries, in practice the database 250 of credentials may hundreds, thousands, or even millions of shipping details for domestic and international shipments.

Figure 23:
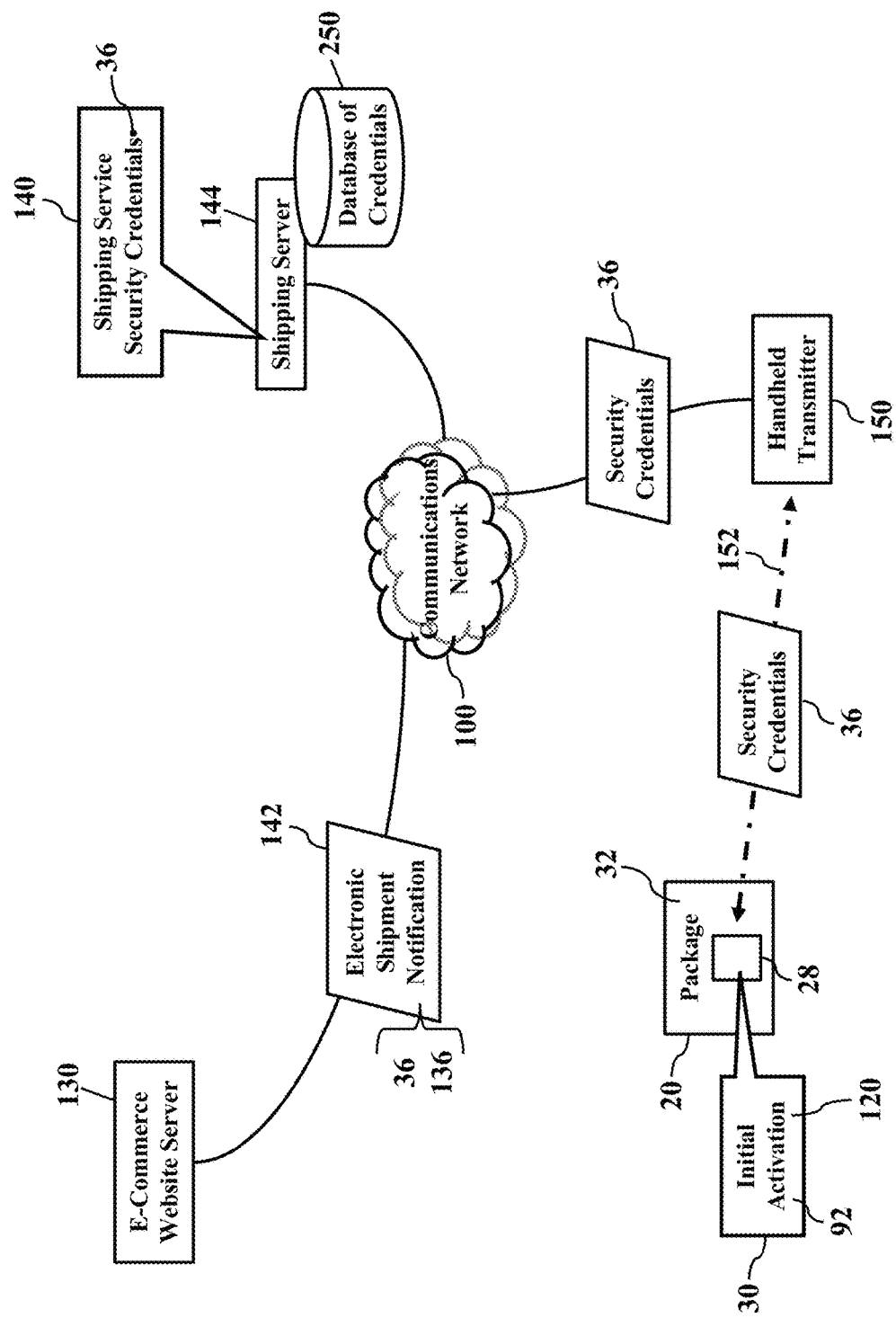

FIG. 23 illustrates the initial activation 30. Once the shipping server 144 determines the security credentials 36, the initial activation 30 may proceed. When the UPS® or FEDEX® delivery driver logs the final delivery of the package 20, the handheld transmitter 150 sends a query (perhaps via the Internet) to the Internet Protocol address associated with the shipping server 144. The query may specify the recipient's name 254, the shipping address 136, and/or the tracking number 256. The shipping server 144 retrieves the corresponding security credentials 36 that are electronically associated with the query parameters. The shipping server 144 sends a query response to the Internet Protocol address associated with the handheld transmitter 150. The handheld transmitter 150 may thus conduct the initial activation 30 of the wireless security device 28.

Figure 24:
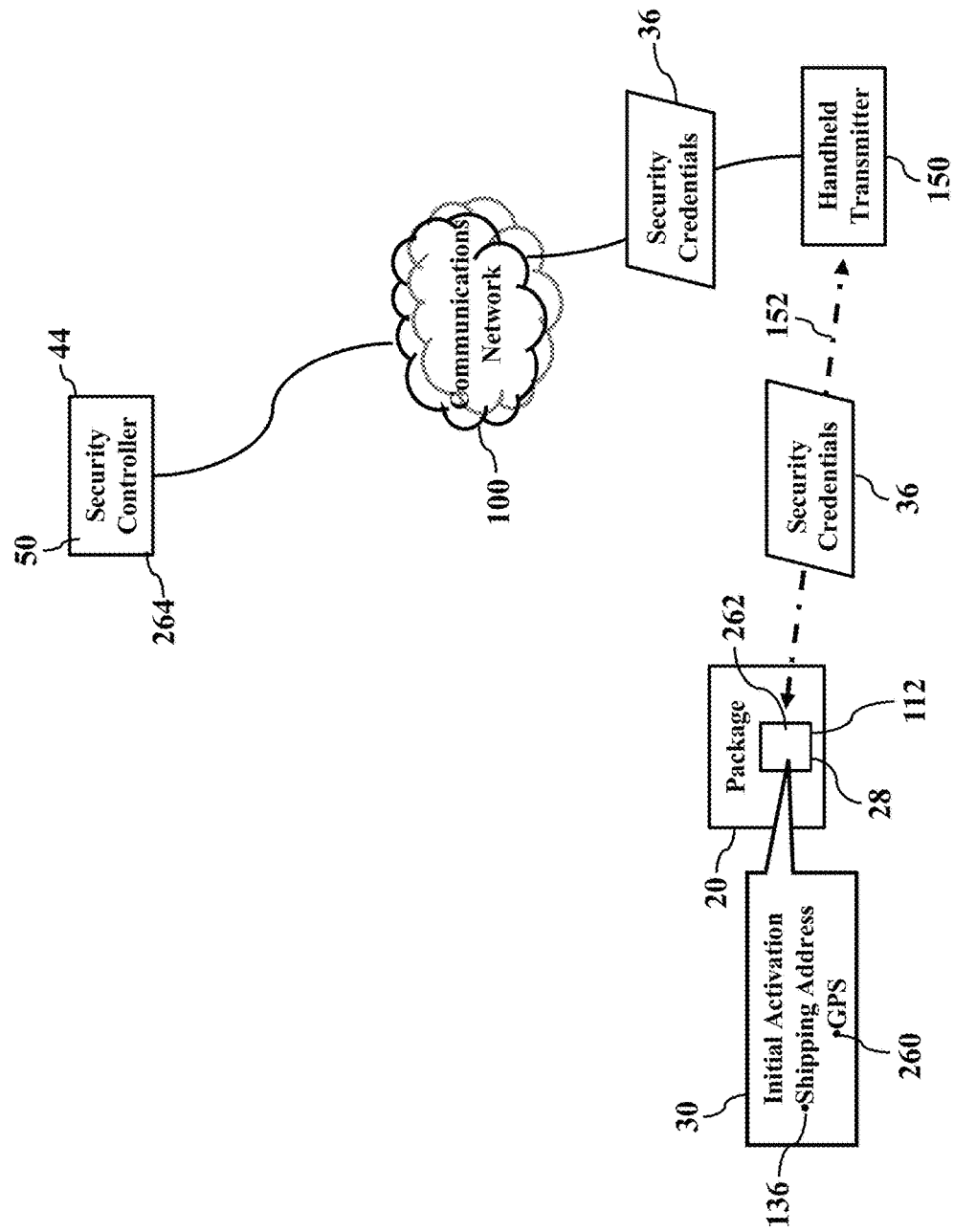
FIG. 24 further illustrates wireless theft, according to exemplary embodiments.

FIG. 24 further illustrates wireless theft, according to exemplary embodiments. Here global positioning system ("GPS") information 260 may be used to infer the theft of the package 20. Here the wireless security device 28 may have a GPS receiver 262 that determines the GPS information 260 representing its current geographical location. When the UPS® or FEDEX® delivery driver conducts the initial activation 30, exemplary embodiments may program the wireless security device 28 to begin periodically reporting its current GPS information 260. The GPS information 260 may thus initially correspond to the final shipping address 136. The wireless security device 28 may thus cause its transceiver 112 to send the GPS information 260 into the communications network 100 (such as WI-FI® or cellular) for routing to the Internet Protocol address associated with the security controller 44. The security controller 44 may thus continually compare the current GPS information 260 to stored GPS coordinates 264 associated with the static or permanent location of the home or business (e.g., the shipping address 136). So, if the wireless security device 28 reports a current location that fails to match the home or business, the security controller 44 may infer the package 20 has been stolen and activate the security precautions 50.

FIG. 25 is a flowchart illustrating an algorithm for secure package delivery, according to exemplary embodiments. The electronic purchase transaction ("EPT") 132 is conducted (Block 300) and the security credentials 36 are established (Block 302). The electronic shipment notification ("ESN") 142 authorizes the shipping service 140 to deliver the package 20 to the shipping address 136 (Block 304). The electronic shipment notification ("ESN") 142 also notifies the shipping service 140 of the security credentials 36 (Block 306). When the package 20 arrives at its final destination (e.g., the shipping address 136), the security credentials 36 are retrieved (Block 308) and the initial activation 30 is performed (Block 310). The wireless security device 28 wirelessly communicates with the security controller 44 (Block 312). If the wireless security device 28 is undetected prior to deactivation, the security precautions 50 are implemented (Block 314). If the security credentials 36 are confirmed, the security precautions 50 are deactivated (Block 316).

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for secure delivery of the package 20, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method for preventing a theft of a package, comprising:
   receiving, by a processing system including a processor, a tracking number associated with the package;
   retrieving by the processing system, a cellular telephone number that is electronically associated with the tracking number;
   retrieving, by the processing system, a mobile application identifier that is electronically associated with the tracking number; and
   programming, by the processing system, a wireless security device integrated with the package with a wireless activation signal including the cellular telephone number and the mobile application identifier to activate the wireless security device with the cellular telephone number and the mobile application identifier as a mechanism to prevent the theft of the package, wherein the wireless security device provides the cellular telephone number and the mobile application identifier to a local security monitoring system.

2. The method of claim 1, further comprising querying, by the processing system, a database to identify the cellular telephone number and the mobile application identifier that are electronically associated with the tracking number.

3. The method of claim 1, further comprising storing, by the processing system, an entry in a database that associates the cellular telephone number and the mobile application identifier to the tracking number.

4. The method of claim 1, wherein the package is delivered to a destination.

5. The method of claim 1, further comprising identifying, by the processing system, a service set identifier that is electronically associated with the tracking number.

6. The method of claim 1, further comprising identifying, by the processing system, a service set identifier that is electronically associated with the cellular telephone number and the mobile application identifier.

7. The method of claim 1, further comprising conducting, by the processing system, an electronic purchase transaction.

8. An apparatus, comprising:
   a processing system including a hardware processor; and
   a memory device, the memory device storing code, the code when executed causing the processing system to perform operations, the operations comprising:
   receiving a tracking number associated with a package;
   identifying a cellular telephone number that is electronically associated with the tracking number;
   identifying a mobile application identifier that is electronically associated with the tracking number; and
   programming a wireless security device integrated with the package with a wireless activation signal including the cellular telephone number and the mobile application identifier to activate the wireless security device with the cellular telephone number and the mobile application identifier as a mechanism to prevent a theft of the package, wherein the wireless security device provides the cellular telephone number and the mobile application identifier to a local security monitoring system.

9. The apparatus of claim 8, wherein the operations further comprise querying a database to identify the cellular telephone number and the mobile application identifier that are electronically associated with the tracking number.

10. The apparatus of claim 8, wherein the operations further comprise storing an entry in a database that associates the cellular telephone number and the mobile application identifier to the tracking number.

11. The apparatus of claim 8, wherein the package is delivered to a destination.

12. The apparatus of claim 8, wherein the operations further comprise identifying a service set identifier that is electronically associated with the tracking number.

13. The apparatus of claim 8, wherein the operations further comprise identifying a service set identifier that is electronically associated with the cellular telephone number and the mobile application identifier.

14. The apparatus of claim 8, wherein the operations further comprise conducting an electronic purchase transaction.

15. A memory device storing instructions that when executed cause a processing system including a hardware processor to perform operations, the operations comprising:
   receiving a tracking number associated with a package to be delivered;
   identifying a cellular telephone number that is electronically associated with the tracking number;
   identifying a mobile application identifier that is electronically associated with the tracking number; and
   programming a wireless security device integrated with the package with a wireless activation signal including the cellular telephone number and the mobile application identifier to activate the wireless security device with the cellular telephone number and the mobile application identifier as a mechanism to prevent a theft of the package, wherein the wireless security device provides the cellular telephone number and the mobile application identifier to a local security monitoring system.

16. The memory device of claim 15, wherein the operations further comprise querying a database to identify the cellular telephone number and the mobile application identifier that are electronically associated with the tracking number.

17. The memory device of claim 15, wherein the operations further comprise storing an entry in a database that associates the cellular telephone number and the mobile application identifier to the tracking number.

18. The memory device of claim 15, wherein package is delivered to a destination.

19. The memory device of claim 15, wherein the operations further comprise identifying a service set identifier that is electronically associated with the tracking number.

20. The memory device of claim 15, wherein the operations further comprise identifying a service set identifier that is electronically associated with the cellular telephone number and the mobile application identifier.

* * * * *